United States Patent
Levoy et al.

(10) Patent No.: US 9,195,880 B1
(45) Date of Patent: Nov. 24, 2015

(54) INTERACTIVE VIEWER FOR IMAGE STACKS

(71) Applicant: Google Inc., Mountain View, CA (US)

(72) Inventors: Marc Stewart Levoy, Stanford, CA (US); Sriram Thirthala, Sunnyvale, CA (US); Samuel William Hasinoff, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 181 days.

(21) Appl. No.: 13/853,953

(22) Filed: Mar. 29, 2013

(51) Int. Cl.
*G06K 9/00* (2006.01)
*G06F 17/30* (2006.01)

(52) U.S. Cl.
CPC ........ *G06K 9/00221* (2013.01); *G06K 9/00496* (2013.01); *G06K 9/00624* (2013.01); *G06F 17/30265* (2013.01); *G06F 17/30268* (2013.01); *G06T 2207/30201* (2013.01)

(58) Field of Classification Search
CPC ................. G06T 2207/30201; G06K 9/00221; G06K 9/00496; G06K 9/00624; G06F 17/30265; G06F 17/30268
See application file for complete search history.

(56) References Cited

U.S. PATENT DOCUMENTS

| | | | |
|---|---|---|---|
| 7,120,293 B2 | 10/2006 | Schoelkopf et al. | |
| 7,149,370 B2 | 12/2006 | Willner et al. | |
| 7,716,157 B1 | 5/2010 | Bourdev et al. | |
| 7,889,886 B2* | 2/2011 | Matsugu et al. | 382/103 |
| 8,306,300 B2 | 11/2012 | Bacus et al. | |
| 8,396,246 B2* | 3/2013 | Anbalagan et al. | 382/100 |
| 8,611,601 B2* | 12/2013 | Calman et al. | 382/103 |
| 8,832,570 B1* | 9/2014 | Marra | 715/758 |
| 8,996,616 B2* | 3/2015 | Srinivasan et al. | 709/204 |
| 2006/0050929 A1* | 3/2006 | Rast et al. | 382/103 |
| 2008/0131019 A1 | 6/2008 | Ng | |
| 2009/0089322 A1* | 4/2009 | Naaman | 707/103 R |
| 2011/0145275 A1* | 6/2011 | Stewart | 707/769 |
| 2011/0145327 A1* | 6/2011 | Stewart | 709/203 |
| 2013/0125069 A1* | 5/2013 | Bourdev et al. | 715/863 |
| 2013/0166390 A1* | 6/2013 | Blow et al. | 705/14.66 |
| 2013/0166391 A1* | 6/2013 | Blow et al. | 705/14.66 |
| 2014/0047386 A1* | 2/2014 | Lynch et al. | 715/810 |
| 2014/0122532 A1* | 5/2014 | Charytoniuk et al. | 707/780 |

* cited by examiner

*Primary Examiner* — Katrina Fujita
(74) *Attorney, Agent, or Firm* — McDonnell Boehnen Hulbert & Berghoff LLP

(57) ABSTRACT

An image-stack viewer may switch between images in an image stack based on detected interactions with the images that are displayed in the viewer. In particular, a region-of-interest (ROI) in an image may be determined based on an interaction, and image characteristics of the ROI may be evaluated in two or more images in the image stack where the ROI best represents the evaluated characteristics.

28 Claims, 11 Drawing Sheets

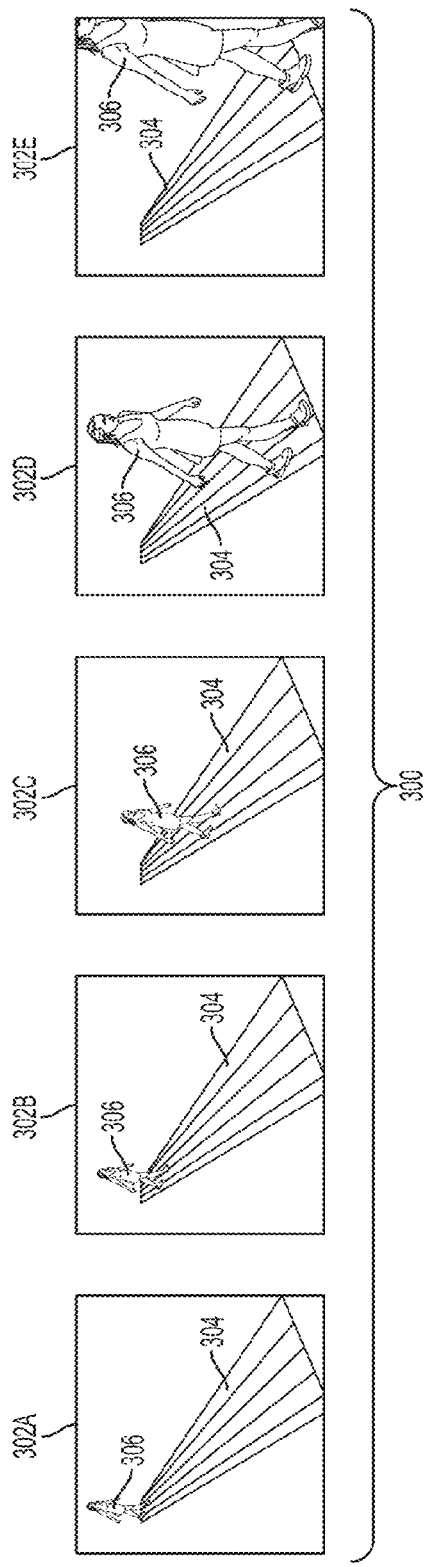
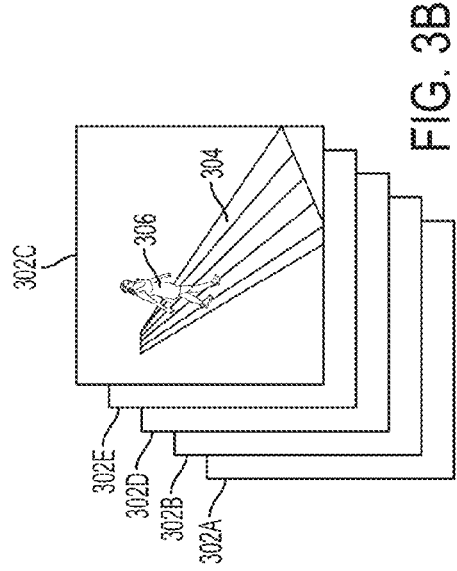

INTERACTIVE VIEWER FOR IMAGE STACKS

BACKGROUND

Mobile devices, such as smartphones and tablets, are providing progressively better cameras that capture for higher-quality digital images. Further, stand-alone compact cameras, digital SLR cameras, and mirrorless interchangeable-lens cameras, are becoming more popular. Thus, the amount of high-quality images being captured is increasing rapidly.

As cameras become smaller and less expensive, and at the same time provide higher quality imaging, the demand for applications and devices that allow users to view images is growing. Users expect to be able to view their images on many different devices, both on-the-go and at home. Further, as a result of social networks and various photo-sharing websites, it has become easier and more common for users to share their images with others via the Internet. Therefore, image viewers that allow users to view images in new and interesting ways are desirable.

SUMMARY

Example embodiments may relate to an image-stack viewer. In particular, an image-stack viewer is described herein that allows a user to interact with images in an image stack, and that dynamically switches which image is displayed based on the interactions. For example, a camera may vary image-capture settings, such as exposure, focus, aperture, and/or white balance settings, across a burst of images that capture a real-world scene. Further, there may be variations in the real-world scene between images in an image stack, such as variations resulting from camera movement and/or movement of objects or people in the scene. As a result, there may not be a single image that best captures every part of the scene—a certain part of the scene might be better captured in one image, while another part of the scene may be better captured in another image. Accordingly, an example image-stack viewer may detect a region-of-interest (ROI) in the image stack based on a user's interaction with a currently-displayed image, and responsively display whichever image from the image stack is determined to best represent the ROI.

In one embodiment, a computer-implemented method involves: (a) causing a graphic display to display an image-stack viewer that comprises a frame, wherein a first image from an image stack that comprises a plurality of images of a scene, is initially displayed in the frame; (b) receiving interaction data that corresponds to an interaction with the image-stack viewer; (c) determining an ROI in the frame, wherein the ROI corresponds to the interaction, and wherein the ROI in the frame maps to a corresponding ROI in each image from the stack; (d) using one or more image characteristics of the ROI in two or more images from the stack as a basis for selecting a second image from the stack, wherein the one or more image characteristics comprise at least one exposure characteristic; and (e) causing the graphic display to display the second image in the frame of the image-stack viewer.

In another embodiment, a computing device may include a non-transitory computer readable medium and program instructions stored on the non-transitory computer readable medium. The program instructions may be executable by at least one processor to: (a) cause a graphic display to display an image-stack viewer that comprises a frame, wherein a first image from an image stack that comprises a plurality of images, is initially displayed in the frame; (b) receive interaction data that corresponds to an interaction with the image-stack viewer; (c) determine an ROI in the frame, wherein the ROI corresponds to the interaction, and wherein the ROI in the frame maps to a corresponding ROI in each image from the stack; (d) based on one or more image characteristics of the ROI in two or more images from the stack, selecting a second image from the stack, wherein the one or more image characteristics comprise at least one exposure characteristic; and (e) cause a graphic display to display the second image in the frame of the image-stack viewer.

In yet another embodiment, a computer-implemented method involves: (a) causing a graphic display to display an image-stack viewer that comprises a frame, wherein a first image from an image stack that comprises a plurality of images of a scene, is initially displayed in the frame; (b) receiving interaction data that corresponds to an interaction with the image-stack viewer; (c) determining an ROI in the frame, wherein the ROI corresponds to the interaction; (d) using one or more image characteristics of the ROI in two or more images from the stack as a basis for selecting a second image from the stack, wherein the one or more image characteristics of the ROI comprise at least one subject attribute of at least one subject in the ROI; and (e) causing the graphic display to display the second image in the frame of the image-stack viewer.

In a further embodiment, a computing device may include a non-transitory computer readable medium and program instructions stored on the non-transitory computer readable medium. The program instructions may be executable by at least one processor to: (a) cause a graphic display to display an image-stack viewer that comprises a frame, wherein a first image from an image stack that comprises a plurality of images of a scene, is initially displayed in the frame; (b) receive interaction data that corresponds to an interaction with the image-stack viewer; (c) determine an ROI in the frame, wherein the ROI corresponds to the interaction; (d) use one or more image characteristics of the ROI in two or more images from the image stack as a basis to select a second image from the image stack, wherein the one or more image characteristics of the ROI comprise at least one subject attribute of at least one subject in the ROI; and (e) cause the graphic display to display the second image in the frame of the image-stack viewer.

In yet a further embodiment, a computer-implemented method involves: (a) causing a graphic display to display an image-stack viewer that comprises a frame, wherein the image-stack viewer is displayed in a social-media interface, wherein a first image from an image stack comprising a plurality of images is initially displayed in the frame, and wherein the image-stack viewer is associated with an account on a social network; (b) receiving interaction data that corresponds to an interaction with the image-stack viewer; (c) determining an ROI in the frame, wherein the ROI corresponds to the interaction, and wherein the ROI in the frame maps to a corresponding ROI in each image from the stack; (d) using one or more image characteristics of the ROI in two or more images from the image stack as a basis to select a second image from the image stack, wherein the one or more image characteristics of the ROI comprise social-network data associated with the ROI; and (e) causing the graphic display to display the second image in the frame of the image-stack viewer.

In another embodiment, a system may include: (a) a means for displaying an image-stack viewer that comprises a frame, wherein a first image from an image stack that comprises a plurality of images of a scene, is initially displayed in the frame; (b) a means for receiving interaction data that corresponds to an interaction with the image-stack viewer; (c) a means for determining an ROI in the frame, wherein the ROI corresponds to the interaction, and wherein the ROI in the frame maps to a corresponding ROI in each image from the stack; (d) a means for using one or more image characteristics of the ROI in two or more images from the stack as a basis for selecting a second image from the stack, wherein the one or more image characteristics comprise at least one exposure characteristic; and (e) a means for displaying the second image in the frame of the image-stack viewer.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE FIGURES

FIG. 3A shows a view of images in an image stack, in accordance with an example embodiment.

FIG. 3B shows a three-dimensional representation of the image stack shown in FIG. 3A.

DETAILED DESCRIPTION

I. Image Capture Devices

Figure 1:
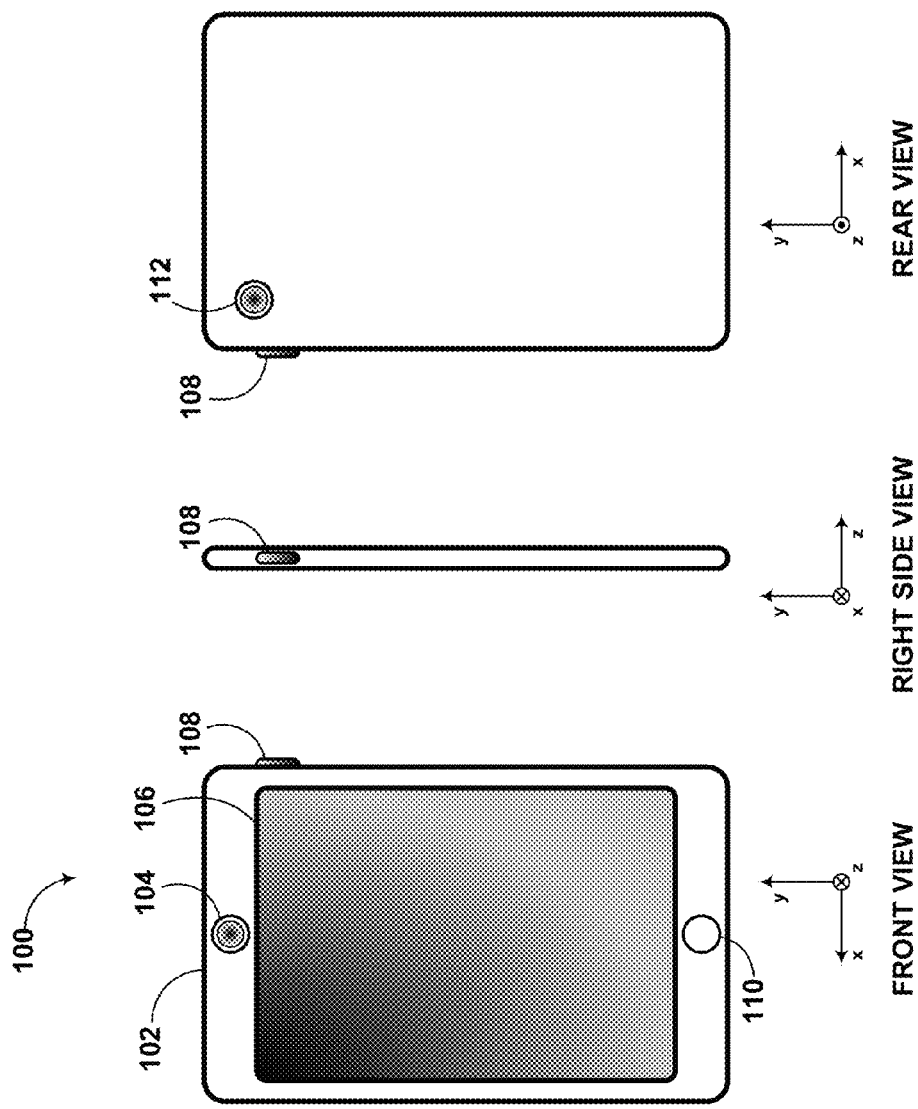
FIG. 1 illustrates the form factor of a digital camera device, in accordance with an example embodiment.

As image capture devices, such as cameras, become more popular, they may be employed as standalone hardware devices or integrated into various other types of devices. For instance, still and video cameras are now regularly included in wireless communication devices (e.g., mobile phones), tablet computers, laptop computers, video game interfaces, home automation devices, and even automobiles and other types of vehicles.

The physical components of a camera may provide an aperture through which light enters, a recording surface for capturing the image represented by the light, and a lens positioned in front of the aperture to focus at least part of the image on the recording surface. The aperture may be fixed size or adjustable. In an analog camera, the recording surface may be photographic film. In a digital camera, the recording surface may include an electronic image sensor (e.g., a charge coupled device (CCD) or a complementary metal-oxide-semiconductor (CMOS) sensor) to transfer and/or store captured images in a data storage unit (e.g., memory).

A shutter may be coupled to or nearby the lens or the recording surface. The shutter may either be in a closed position, in which it blocks light from reaching the recording surface, or an open position, in which light is allowed to reach to recording surface. The position of the shutter may be controlled by a shutter button. For instance, the shutter may be in the closed position by default. When the shutter button is triggered (e.g., pressed), the shutter may change from the closed position to the open position for a period of time, known as the shutter cycle. During the shutter cycle, an image may be captured on the recording surface. At the end of the shutter cycle, the shutter may change back to the closed position.

Alternatively, the shuttering process may be electronic. For example, before an electronic shutter of a CCD image sensor is "opened" the sensor may be reset to remove any residual signal in its photodiodes. While the electronic shutter remains open, the photodiodes may accumulate charge. When or after the shutter closes, these charges may be transferred to longer-term data storage. Combinations of mechanical and electronic shuttering may also be possible.

Regardless of type, a shutter may be activated and/or controlled by something other than a shutter button. For instance, the shutter may be activated by a softkey, a timer, or some other trigger. Herein, the term "image capture" may refer to any mechanical and/or electronic shuttering process that results in one or more photographs being recorded, regardless of how the shuttering process is triggered or controlled.

The exposure of a captured image may be determined by a combination of the size of the aperture, the brightness of the light entering the aperture, and the length of the shutter cycle (also referred to as the shutter length or the exposure length). Additionally, a digital or analog gain may be applied to the image, thereby influencing the exposure. In some embodiments, the term "total exposure length" or "total exposure time" may refer to the shutter length multiplied by the gain for a particular aperture size. Herein, the term "total exposure time," or "TET," should be interpreted as possibly being a shutter length, an exposure time, or any other metric that controls the amount of signal response that results from light reaching the recording surface.

Herein, the terms "image capture device" or "camera" should be understood to include devices that can capture still images, devices that can capture video, and devices that can capture both still images and video. A still camera may capture one or more images each time image capture is triggered. A video camera may continuously capture images at a particular rate (e.g., 24 images—or frames—per second) as long as image capture remains triggered (e.g., while the shutter button is held down). Some digital still cameras may open the shutter when the camera device or application is activated, and the shutter may remain in this position until the camera device or application is deactivated. While the shutter is open, the camera device or application may capture and display a representation of a scene on a viewfinder. When image capture is triggered, one or more distinct digital images of the current scene may be captured.

Cameras—even analog cameras—may include software to control one or more camera functions and/or settings, such as aperture size, TET, gain, and so on. Additionally, some cameras may include software that digitally processes images during or after these images are captured. While it should be understood that the description above refers to cameras in general, it may be particularly relevant to digital cameras.

As noted previously, digital cameras may be standalone devices or integrated with other devices. As an example, FIG. 1 illustrates the form factor of a digital camera device 100. Digital camera device 100 may be, for example, a mobile phone, a tablet computer, or a wearable computing device. However, other embodiments are possible. Digital camera device 100 may include various elements, such as a body 102, a front-facing camera 104, a multi-element display 106, a shutter button 108, and other buttons 110. Digital camera device 100 could further include a rear-facing camera 112. Front-facing camera 104 may be positioned on a side of body 102 typically facing a user while in operation, or on the same side as multi-element display 106. Rear-facing camera 112 may be positioned on a side of body 102 opposite front-facing camera 104. Referring to the cameras as front and rear facing is arbitrary, and digital camera device 100 may include multiple cameras positioned on various sides of body 102.

Multi-element display 106 could represent a cathode ray tube (CRT) display, a light emitting diode (LED) display, a liquid crystal (LCD) display, a plasma display, or any other type of display known in the art. In some embodiments, multi-element display 106 may display a digital representation of the current image being captured by front-facing camera 104 and/or rear-facing camera 112, or an image that could be captured or was recently captured by either or both of these cameras. Thus, multi-element display 106 may serve as a viewfinder for either camera. Multi-element display 106 may also support touchscreen and/or presence-sensitive functions that may be able to adjust the settings and/or configuration of any aspect of digital camera device 100.

Front-facing camera 104 may include an image sensor and associated optical elements such as lenses. Front-facing camera 104 may offer zoom capabilities or could have a fixed focal length. In other embodiments, interchangeable lenses could be used with front-facing camera 104. Front-facing camera 104 may have a variable mechanical aperture and a mechanical and/or electronic shutter. Front-facing camera 104 also could be configured to capture still images, video images, or both. Further, front-facing camera 104 could represent a monoscopic, stereoscopic, or multiscopic camera. Rear-facing camera 112 may be similarly or differently arranged. Additionally, front-facing camera 104, rear-facing camera 112, or both, may be an array of one or more cameras.

Either or both of front facing camera 104 and rear-facing camera 112 may include or be associated with an illumination component that provides a light field to illuminate a target object. For instance, an illumination component could provide flash or constant illumination of the target object. An illumination component could also be configured to provide a light field that includes one or more of structured light, polarized light, and light with specific spectral content. Other types of light fields known and used to recover three-dimensional (3D) models from an object are possible within the context of the embodiments herein.

Either or both of front facing camera 104 and rear-facing camera 112 may include or be associated with an ambient light sensor that may continuously or from time to time determine the ambient brightness of a scene that the camera can capture. In some devices, the ambient light sensor can be used to adjust the display brightness of a screen associated with the camera (e.g., a viewfinder). When the determined ambient brightness is high, the brightness level of the screen may be increased to make the screen easier to view. When the determined ambient brightness is low, the brightness level of the screen may be decreased, also to make the screen easier to view as well as to potentially save power. Additionally, the ambient light sensor's input may be used to determine a TET of an associated camera, or to help in this determination.

Digital camera device 100 could be configured to use multi-element display 106 and either front-facing camera 104 or rear-facing camera 112 to capture images of a target object. The captured images could be a plurality of still images or a video stream. The image capture could be triggered by activating shutter button 108, pressing a softkey on multi-element display 106, or by some other mechanism. Depending upon the implementation, the images could be captured automatically at a specific time interval, for example, upon pressing shutter button 108, upon appropriate lighting conditions of the target object, upon moving digital camera device 100 a predetermined distance, or according to a predetermined capture schedule.

A. Example Components of a Computing Device with a Camera

As noted above, the functions of digital camera device 100—or another type of digital camera—may be integrated into a computing device, such as a wireless communication device, tablet computer, laptop computer and so on. For purposes of example, FIG. 2 is a simplified block diagram showing some of the components of an example computing device 200 that may include camera components 224.

By way of example and without limitation, computing device 200 may be a cellular mobile telephone (e.g., a smartphone), a still camera, a video camera, a fax machine, a computer (such as a desktop, notebook, tablet, or handheld computer), a personal digital assistant (PDA), a home automation component, a digital video recorder (DVR), a digital television, a remote control, a wearable computing device, or some other type of device equipped with at least some image capture and/or image processing capabilities. It should be understood that computing device 200 may represent a physical camera device such as a digital camera, a particular physical hardware platform on which a camera application operates in software, or other combinations of hardware and software that are configured to carry out camera functions.

Figure 2:
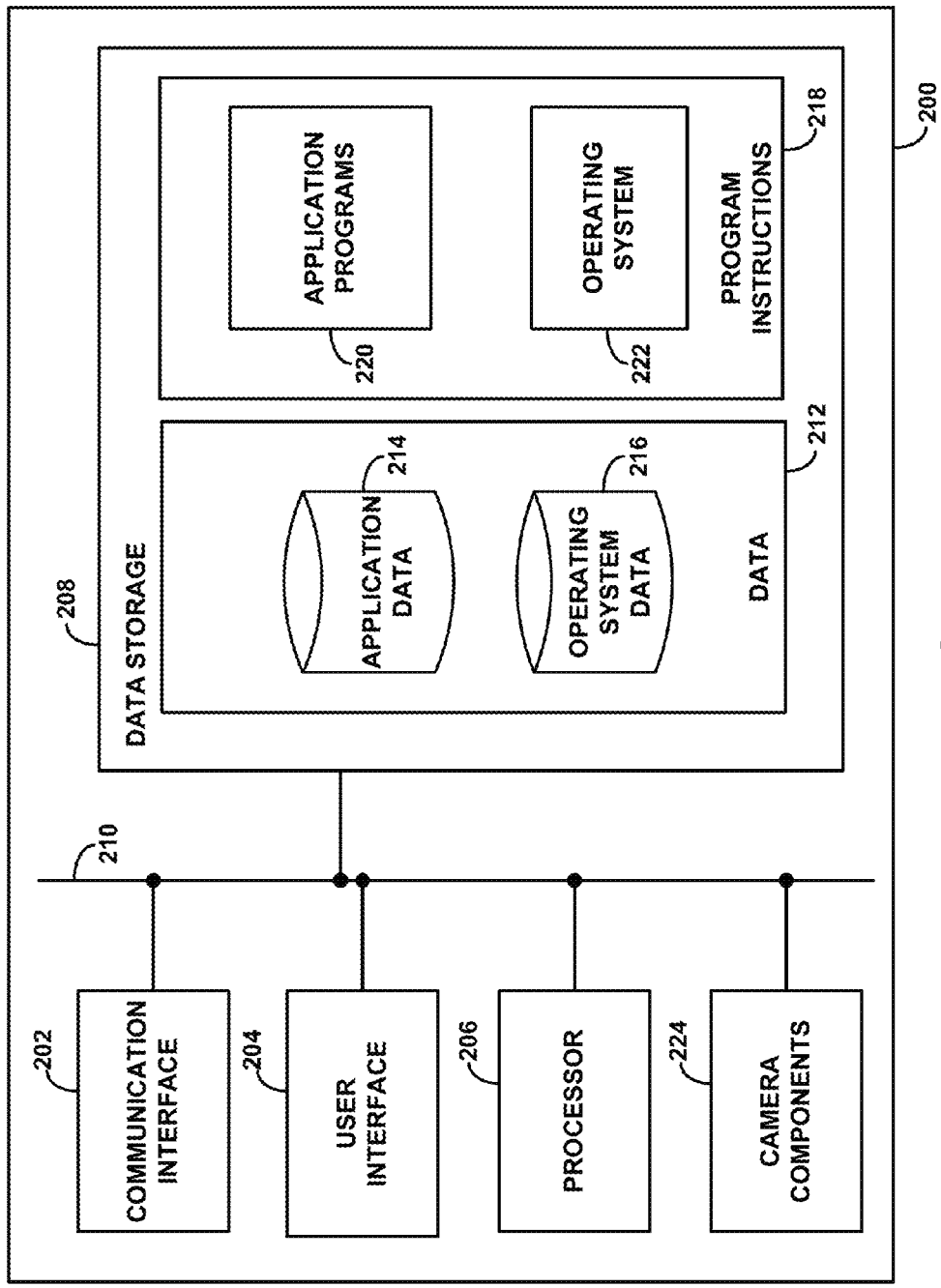
FIG. 2 is a simplified block diagram showing some of the components of an example computing device, in accordance with an example embodiment.

As shown in FIG. 2, computing device 200 may include a communication interface 202, a user interface 204, a processor 206, data storage 208, and camera components 224, all of which may be communicatively linked together by a system bus, network, or other connection mechanism 210.

Communication interface 202 may function to allow computing device 200 to communicate, using analog or digital modulation, with other devices, access networks, and/or transport networks. Thus, communication interface 202 may facilitate circuit-switched and/or packet-switched communication, such as plain old telephone service (POTS) communication and/or Internet protocol (IP) or other packetized communication. For instance, communication interface 202 may include a chipset and antenna arranged for wireless communication with a radio access network or an access point. Also, communication interface 202 may take the form of or include a wireline interface, such as an Ethernet, Universal Serial Bus (USB), or High-Definition Multimedia Interface (HDMI) port. Communication interface 202 may also take the form of or include a wireless interface, such as a Wifi, BLUETOOTH®, global positioning system (GPS), or wide-area wireless interface (e.g., WiMAX or 3GPP Long-Term Evolution (LTE)). However, other forms of physical layer interfaces and other types of standard or proprietary communication protocols may be used over communication interface 202. Furthermore, communication interface 202 may comprise multiple physical communication interfaces (e.g., a Wifi interface, a BLUETOOTH® interface, and a wide-area wireless interface).

User interface 204 may function to allow computing device 200 to interact with a human or non-human user, such as to receive input from a user and to provide output to the user. Thus, user interface 204 may include input components such as a keypad, keyboard, touch-sensitive or presence-sensitive panel, computer mouse, trackball, joystick, microphone, and so on. User interface 204 may also include one or more output components such as a display screen which, for example, may be combined with a presence-sensitive panel. The display screen may be based on CRT, LCD, and/or LED technologies, or other technologies now known or later developed. User interface 204 may also be configured to generate audible output(s), via a speaker, speaker jack, audio output port, audio output device, earphones, and/or other similar devices.

In some embodiments, user interface 204 may include a display that serves as a viewfinder for still camera and/or video camera functions supported by computing device 200. Additionally, user interface 204 may include one or more buttons, switches, knobs, and/or dials that facilitate the configuration and focusing of a camera function and the capturing of images (e.g., capturing a picture). It may be possible that some or all of these buttons, switches, knobs, and/or dials are implemented as functions on a presence-sensitive panel.

Processor 206 may comprise one or more general purpose processors—e.g., microprocessors—and/or one or more special purpose processors—e.g., digital signal processors (DSPs), graphics processing units (GPUs), floating point units (FPUs), network processors, or application-specific integrated circuits (ASICs). In some instances, special purpose processors may be capable of image processing, image alignment, and merging images, among other possibilities. Data storage 208 may include one or more volatile and/or non-volatile storage components, such as magnetic, optical, flash, or organic storage, and may be integrated in whole or in part with processor 206. Data storage 208 may include removable and/or non-removable components.

Processor 206 may be capable of executing program instructions 218 (e.g., compiled or non-compiled program logic and/or machine code) stored in data storage 208 to carry out the various functions described herein. Therefore, data storage 208 may include a non-transitory computer-readable medium, having stored thereon program instructions that, upon execution by computing device 200, cause computing device 200 to carry out any of the methods, processes, or functions disclosed in this specification and/or the accompanying drawings. The execution of program instructions 218 by processor 206 may result in processor 206 using data 212.

By way of example, program instructions 218 may include an operating system 222 (e.g., an operating system kernel, device driver(s), and/or other modules) and one or more application programs 220 (e.g., camera functions, address book, email, web browsing, social networking, and/or gaming applications) installed on computing device 200. Similarly, data 212 may include operating system data 216 and application data 214. Operating system data 216 may be accessible primarily to operating system 222, and application data 214 may be accessible primarily to one or more of application programs 220. Application data 214 may be arranged in a file system that is visible to or hidden from a user of computing device 200.

Application programs 220 may communicate with operating system 222 through one or more application programming interfaces (APIs). These APIs may facilitate, for instance, application programs 220 reading and/or writing application data 214, transmitting or receiving information via communication interface 202, receiving and/or displaying information on user interface 204, and so on.

In some vernaculars, application programs 220 may be referred to as "apps" for short. Additionally, application programs 220 may be downloadable to computing device 200 through one or more online application stores or application markets. However, application programs can also be installed on computing device 200 in other ways, such as via a web browser or through a physical interface (e.g., a USB port) on computing device 200.

Camera components 224 may include, but are not limited to, an aperture, shutter, recording surface (e.g., photographic film and/or an image sensor), lens, and/or shutter button. Camera components 224 may be controlled at least in part by software executed by processor 206.

Captured digital images may be represented as a one-dimensional, two-dimensional, or multi-dimensional array of pixels. Each pixel may be represented by one or more values that may encode the respective pixel's color and/or brightness. For example, one possible encoding uses the YCbCr color model. In this color model, the Y channel may represent the brightness of a pixel, and the Cb and Cr channels may represent the blue chrominance and red chrominance, respectively, of the pixel. For instance, each of these channels may take values from 0 to 255 (i.e., the tonal range that a single 8-bit byte can offer). Thus, the brightness of a pixel may be represented by a 0 or a value near zero if the pixel is black or close to black, and by a 255 or a value near 255 if the pixel is white or close to white. However, the value of 255 is a non-limiting reference point, and some implementations may use different maximum values (e.g., 1023, 4095, etc.).

Nonetheless, the YCbCr color model is just one possible color model, and other color models such as a red-green-blue (RGB) color model or a cyan-magenta-yellow-key (CMYK) may be employed with the embodiments herein. Further, the pixels in an image may be represented in various file formats, including raw (uncompressed) formats, or compressed formats such as Joint Photographic Experts Group (JPEG), Portable Network Graphics (PNG), Graphics Interchange Format (GIF), and so on.

Some pixel encodings—including the YCbCr color model—use 8 bits to represent the brightness of each pixel. Doing may be referred to as LDR imaging. As a result, only 256 levels of brightness may be supported. However, real-world scenes often exhibit a wider dynamic range of brightness than can be reasonably represented by LDR imaging. For example, a scene of an individual standing in a dark room in front of a window may include both extremely bright regions and extremely dark regions. However, use of LDR imaging to capture an image of such a scene may result in loss of detail in the bright region and/or the dark region based on the TET with which the image was captured.

A short TET may result in a reasonably accurate representation of the bright regions of a scene, but underexposure of the dark regions. Conversely, a long TET may result in a reasonably accurate representation of the dark regions, but may overexpose the bright regions. In the example scene introduced above, if the TET is too long, the features in the room may appear properly-exposed, but the features outside the window may appear whitewashed. But if the TET is too short, the features outside the window may appear normal but the features in the room may appear darkened. Either of these outcomes is undesirable. For some scenes, there may not be a single TET that results in a captured image representing the details in both bright regions and dark regions with acceptable detail.

B. Automatic Settings for Image Capture

Camera devices may support an auto-exposure (AE) mode in which, prior to capturing an image, the camera evaluates the scene and determines camera settings, such as settings affecting TET, to use to capture the image. For example, the user may observe the scene in the camera's viewfinder before triggering image capture. During this period, the camera may make an initial estimate of the proper TET, capture a preview image with that TET, and then evaluate the pixels in the captured image. Then, as one possible implementation, if a majority (or some other sufficient fraction) of the pixels in the preview image are over-exposed, the camera may decrease the TET and capture another preview image. If a majority (or some other sufficient fraction) of the pixels in this preview image are under-exposed, the camera may increase the TET and capture yet another preview image.

For instance, if the majority of the pixels in the captured image exhibit a brightness value above a high threshold level (e.g., 240), the camera may decrease the TET. On the other hand, if a majority of the pixels exhibit a brightness level below a low threshold level (e.g., 96), the camera may increase the TET.

Alternatively or additionally, a target average pixel value for some or all of the scene's pixels may be determined. If the actual average pixel value is above the target average pixel value, the TET may be decreased, and if the actual average pixel value is below the target average pixel value, the TET may be increased. The target average pixel value can also be tuned differently depending on how much contrast there is in the scene. For example, in a low-contrast scene, the target average pixel value may be bright (e.g., 200). But in a high-contrast scene, the target average pixel value may be lower (e.g., 128).

This process may continue until the camera determines that an image should be captured and stored (e.g., the user activates the shutter button). During this process, if the characteristics of the scene are relatively unchanging, the camera usually converges on an estimated "best" TET based on the brightness of the scene. In some embodiments, the image displayed on the camera's viewfinder may omit information from one or more of the captured preview images or combine information from two or more of the captured preview images.

In some cases, the camera might not treat all pixels equally when determining an "average" brightness of the scene. Using a technique described as "center-weighted averaging," pixels near the middle of the scene may be considered to be more important. Thus, these pixels may be weighted more than pixels illustrating other areas of the scene. Alternatively, pixels in other locations of an image may be given more weight. For instance, if the camera detects a human face (or some other object of interest) in a particular location other than the center of the image, the camera may give a higher weight to the associated pixels.

In this way, AE algorithms may seek to determine a TET that produces a large number (e.g., the largest number) of properly-exposed pixels. However, given the range limitations of LDR imaging, even images captured in AE mode may contain portions that are whitewashed or darkened. Thus, as noted above, some scenes there may be no single "best" TET.

AE algorithms may differ from the description above. For instance, some may be more complex, treating different colors differently, considering the spatial and/or structural components of a scene, and/or measuring contrast between regions. The embodiments herein, however, may operate with any AE algorithm now known or developed in the future.

II. Image Stacks

A camera (or possibly multiple cameras) may be configured to capture a number of related images, which may collectively be referred to as an "image stack." In some embodiments, an image stack may include two or more images of substantially the same scene. Note, however, that different images may be considered to include substantially the same scene when some or all of the images include slightly different scenes that overlap significantly, such that a substantial portion of each scene is included in all of the images. In other embodiments, an image stack may include two or more temporally related images (which may or may not be of substantially the same scene). Additionally or alternatively, an image stack may include images that are related in other ways.

The images making up an image stack may be captured in various ways. For example, an image stack may include two or more frames from a video clip, or two or more still images. In some cases, an image stack may include two or more still images that are captured during a single image-capture event, such as when a "burst" of images is taken in response to a single press of the shutter button or in response to the shutter button being pressed and held down. In other cases, an image stack may be captured during multiple image-capture events (e.g., multiple presses of a shutter button). The images for an image stack could also be captured in other ways, without departing from the scope of the invention.

FIG. 3A shows a view of images in an image stack 300, according to an example. As shown, image stack 300 includes five images 302A to 302E, which capture a scene that includes a running track 304. Further, the images 302A to 302E show a runner 306 as the runner progress along the track 304, from a starting line at the far end of the track with respect to the camera that captured images 302A to 302E, to the near end of with respect to the camera. Thus, the images 302A to 302E of image stack 300 are temporally related to one another, with image 302A being the first image in a sequence that ends with image 302E.

FIG. 3B shows a three-dimensional representation of the image stack 300 shown in FIG. 3A. The three-dimensional representation illustrates the structure of the image stack 300, when the image stack 300 is presented in an image-stack viewer. In particular, when an image stack 300 is displayed, the stack may be thought of as a stack of images where the image that is viewable at a given point in time is the image that is "on top" of the stack at the given point in time. In FIG. 3B, image 302C is on top of the image stack, which may indicate that this image is currently selected for display in an image viewer. The order of the other images 302A, 302B, 302D, and 302E that is shown in FIG. 3B may or may not have significance, depending upon the particular implementation.

In image stack 300, the images 302A to 302E are captured during a race on a running track. In the illustrated example, consider that the images in the stack may have captured the race scene over a period of ten to fifteen seconds, for instance. However, the time period covered by the images in an image stack may vary, depending upon the particular implementation. In some cases, all of the images in an image stack could be captured within a shorter period of time, such as 50 ms, for example. In other cases, the images in an image stack could be captured over a long period of time, such as over days, months, or even years. For example, an image stack might include a sequence of images capturing seasonal changes in an mountain scene (e.g., images that could be used to generate a time-lapse video or slide show).

Further, in some cases, an image stack may include two or more images that are all generated from a single image. In such an embodiment, a camera might only need to capture a single image of a scene, which may be referred to as a "base image." The images making up the image stack may then be generated by processing the base image in different ways.

Note that in such an embodiment, the base image could be included in or omitted from the image stack.

In some embodiments, an image stack may include images of a scene that are captured using different image-capture settings, and which have different image characteristics as a result. To do so, a camera may capture multiple images of a scene, and adjust one or more image-capture settings each time one of the images is captured. For example, a camera may adjust the settings for one or more image-capture parameters, such as an exposure parameter (e.g., the TET), an aperture parameter, an ISO parameter, a focal-point parameter, a white-balance parameter, and/or a tone-mapping parameter, among other possibilities.

Figure 4A:
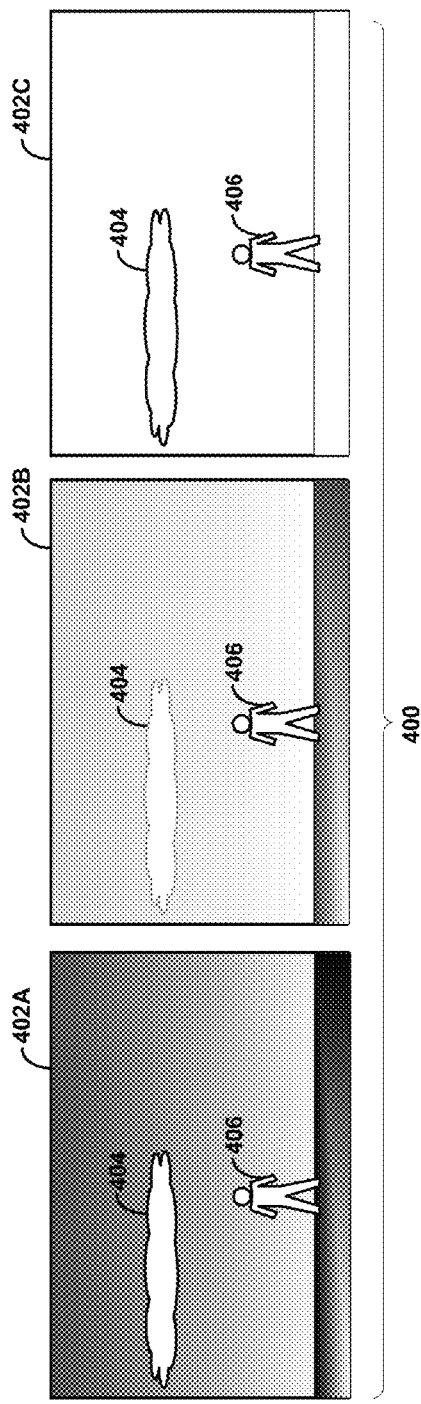
FIG. 4A shows an image stack in which exposure is varied across the images in the image stack, in accordance with an example embodiment.

FIG. 4A shows an image stack 400 in which exposure is varied across the images in the image stack, according to an example. As shown, image stack 400 includes three images 402A to 402C. Each image 402A to 402C uses a different exposure setting to capture substantially the same scene of a person 406 with clouds 404 overhead. For example, image 402B may be an image that is captured with exposure settings determined by an AE process, such as one of the processes for determining TET described above. Further, images 402A and 402C may be underexposed and overexposed, respectively, as compared to image 402B. To adjust the exposure, the camera may adjust the shutter speed, F-stop, ISO, the area of the scene used to evaluate the exposure, and/or other settings, as each image is captured.

Figure 4B:
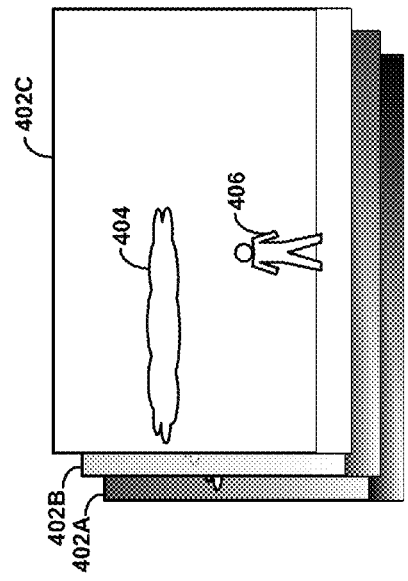
FIG. 4B shows a three-dimensional representation of the image stack shown in FIG. 4A.

FIG. 4B shows a three-dimensional representation of the image stack 400 that is shown in FIG. 4A. The three-dimensional representation illustrates the structure of image stack 400 when the image stack 400 is presented in an image-stack viewer. In particular, when displayed, image stack 400 may be thought of as a stack of images where the image 402C that is currently "on top" of the stack is viewable, and different images may be moved to the top of the stack at different points in time.

Note that other image characteristics may vary across images in an image stack, in addition or in the alternative to those affecting exposure. Further, settings that affect exposure may be varied to change image characteristics other than exposure. Examples of other image characteristics that could vary across images from an image stack include, but are not limited to: (a) shutter speed, (b) aperture, (c) ISO, (d) white balance, and/or (e) focus (e.g., depth of field and/or the focal point or points in the scene), among other possibilities.

Further, in some embodiments, the images in an image stack may represent different tone mappings of a high dynamic range (HDR) or low dynamic range (LDR) image. For example, each image in a stack could be a tone-mapped HDR image that was created using different processing algorithms or parameters. As one specific example, each image could be generated by using a different frame from an image burst as the reference frame for an HDR image-generation process. Other examples are also possible.

It should be understood that image stacks 300 and 400 are but two of numerous possible types of image stacks where one or more image characteristics vary between the images in the stack. Other types of image stacks and variations on image stacks 300 and 400 are possible. Further, it should be understood that an image stack may include more or less images than the examples described in FIGS. 3A and 4A, without departing from the scope of the invention.

In some cases, an image stack may capture a scene that remains substantially unchanged between the images in the stack. For example, the person and cloud shown in image stack 400 both remain in substantially the same location (e.g., at the same image coordinates) in all of the images 402A to 402C in the stack. In other cases, there may be significant motion in a scene that is captured by an image stack. For example, progressing from image 302A to 302E of image stack 300, the runner 306 moves from the left to the right and grows larger in the image frame (e.g., by changing image coordinates and increasing the area of frame occupied by runner 306 in each image 302A to 302E).

In some cases, it may be desirable for images to be captured quickly enough that the image stack captures a scene with as little motion as possible, such as in some instances where the images are merged in post-processing. For example, in some HDR processes where multiple images from a stack are merged to create an HDR image, having less motion between the images in the stack may result in a higher-quality merged image. As another example, consider a focus-stacking process, where images having different apertures (so as to vary the depth of field) and/or having different focal points are merged to create an image with a greater depth-of-field. In such a focus-stacking process, reducing or eliminating the motion in the scene that occurs between the images in a stack may improve the quality of the merged image.

In other cases, however, an image stack may include images that are captured without consideration of whether or not there is motion in the captured scene. And in some cases, an image stack may be captured so as to intentionally capture motion in a scene. Further, an image stack where one or more image-capture settings are adjusted between each image, may also be allowed to or designed to capture motion between images.

III. Image-Stack Viewers

Figure 3C:
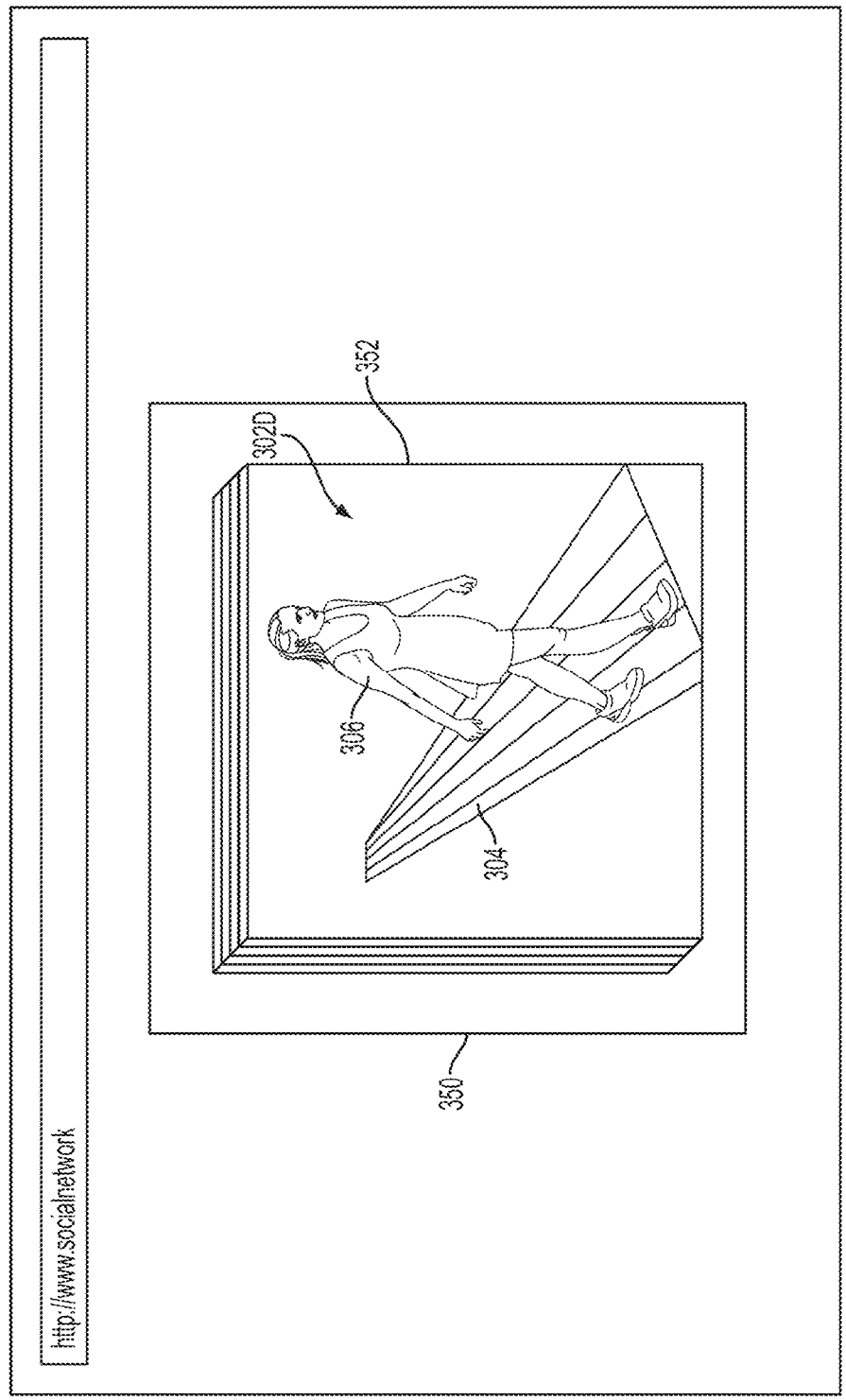
FIG. 3C is a simplified illustration of a graphical user interface for an image-stack viewer, in accordance with an example embodiment.

FIG. 3C is a simplified illustration of a graphical user interface (GUI) for an image-stack viewer 350, according to an example. The image stack viewer 350 includes a frame 352, where an image stack can be displayed. Further, in an example embodiment, image-stack viewer 350 may display one image from the image stack at a time, with the possible exception of transition periods where image-stack viewer 350 is switching between two images in an image stack. In such transition periods, the image-stack viewer 350 may display transitional graphics or animations, which might include or be generated from some combination of two or more images. Note, however, that embodiments where an image-stack viewer does not display one image at a time are also possible.

In FIG. 3C, image stack 300 is being displayed in the frame 352 of the image-stack viewer 350. More specifically, at the point in time shown in FIG. 3C, the image-stack viewer 350 is displaying image 302D in frame 352, which shows the runner 306 about to cross the finish line on the running track 304. However, for various reasons, the image-stack viewer can change which of images 302A to 302E is displayed in the frame 352. For instance, in an exemplary embodiment, image-stack viewer 350 may switch between displaying image 302A, 302B, 302C, 302D, or 302E according to a user's interactions with image-stack viewer 350 (e.g., interactions with the image that is currently displayed in the frame 352).

Figure 4C:
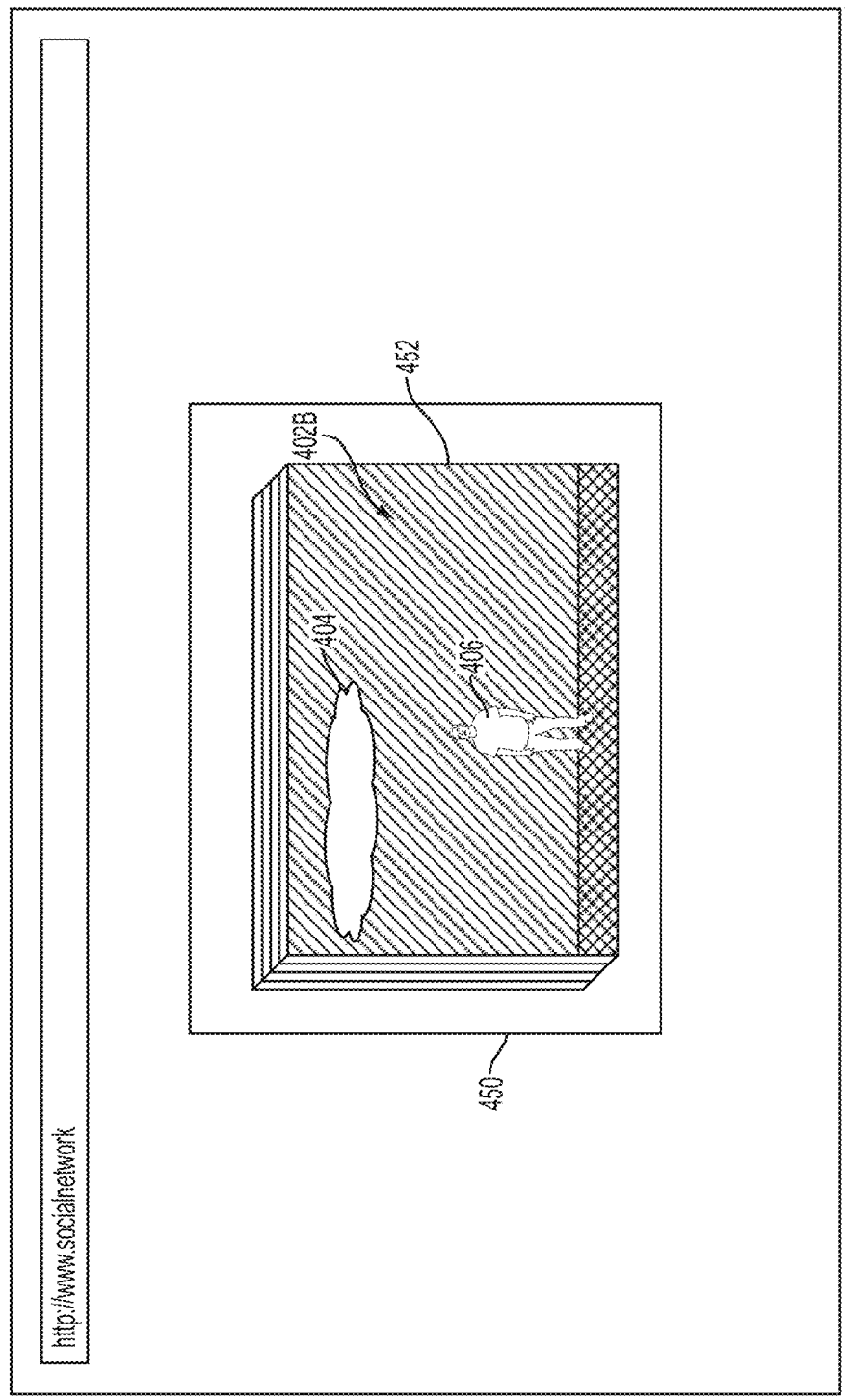
FIG. 4C is another simplified illustration of a graphical user interface for an image-stack viewer, in accordance with an example embodiment.

FIG. 4C is another simplified illustration of the image-stack viewer 350 that is shown in FIG. 3C, according to an example. In FIG. 4C, however, image-stack viewer 350 is displaying image stack 400 in frame 352. More specifically, at the point in time shown in FIG. 4C, the image-stack viewer 350 is displaying image 402B in frame 352. Further, the image-stack viewer 350 may, for various reasons, switch or transition between images 402A to 402C in frame 352. For instance, in an exemplary embodiment, image-stack viewer

350 may switch between images 402A to 402C based on a user's interactions with the image-stack viewer 350.

In an example embodiment, one or more types of user interactions may be interpreted as indicating a region of interest (ROI) in the frame 352 of an image-stack viewer 350. For example, a particular ROI may be identified when a user interacts with an image in the frame 352, such as by: (a) hovering a mouse cursor over or near to the ROI, (b) clicking on the image at location within or near to the ROI, (c) using an eye gesture (such as staring or winking) to indicate a location within or near to the ROI, (d) using a hand gesture to indicate a location within or near to the ROI, (e) performing a touch gesture on a touchpad to indicate a location within or near to the ROI, and/or (f) tagging a location within or near to the ROI via a social networking website or application, among other possibilities.

Further, in an example embodiment, when an image-stack viewer 350 switches from a first image to a second image in an image stack, the viewer may display a graphical transition between the two images. In some cases, the transition may be based at least in part on the first image that is no longer being displayed and/or the second image that is about to be displayed. Additionally or alternatively, the transition may include or be based at least in part on intervening images from the image stack, which were captured in between the first and the second image. In some embodiments, a computing device may dynamically generate transitional graphics based on image characteristics of the image stack, subject attributes of the scene that is captured in the image stack, and/or an analysis of motion captured in the image stack. Examples of transitions are described in greater detail in section VII below.

In an example embodiment, an image stack, such as image stack 300 or 400, may be defined by an image-stack file. An image-stack file may include the images in the stack, or include pointers to the locations in data storage where the images are stored. An image-stack file could also define a default image, which should be displayed in an image-stack viewer when the image stack is first loaded in the viewer. Further, an image-stack file may define one or more relationships between the images in stack. For instance, an image-stack file may pre-define ROIs that correspond to interactions at certain areas or locations within the image. The image-stack file could further define, for each of one or more ROIs, which image from the stack should be displayed when the ROI is interacted with. Additionally, the image-stack file could indicate specific graphical transitions to be used by an image-stack viewer when transitioning between certain pairs of images.

In some embodiments, a computing device may perform some pre-processing on an image stack in order to prepare the image stack for an image-stack viewer 350. For example, a computing device could perform an alignment process to provide better mutual geometric alignment of the images in a stack. In such an embodiment, the alignment process could stabilize the background in the image stack. Alternatively, the alignment process could stabilize a subject of interest in the image stack. For example, in an image stack including a sequence of images that captures a sunset, an alignment process may stabilize the sun, such that it appears in substantially the same location in the frame of the image-stack viewer 350, as the image-stack viewer transitions between images in the image stack. Pre-processing could also involve a computing device implementing per-frame warps to correct for camera motion, rolling shutter artifacts, and so on, in each image.

Additionally or alternatively, a computing device may generate transitions between images in advance. For example, a computing device could generate a set of all possible "video" transitions between pairs of images in a stack, in an effort to provide a faster and/or more efficient viewing experience in the image-stack viewer 350.

IV. Selection of a Default Image for an Image Stack

In an example embodiment, one of the images in an image stack may be selected as an initial image, which an image-stack viewer 350 displays when it first presents an image stack in frame 352. Various techniques may be used to select the initial image from an image stack. For example, a default image may be selected by evaluating various image characteristics and/or various subject attributes of the subjects in the captured scene, and selecting an image that is believed to be the best, based on such evaluation.

V. Methods for Providing a Dynamic Image-Stack Viewer

Figure 5:
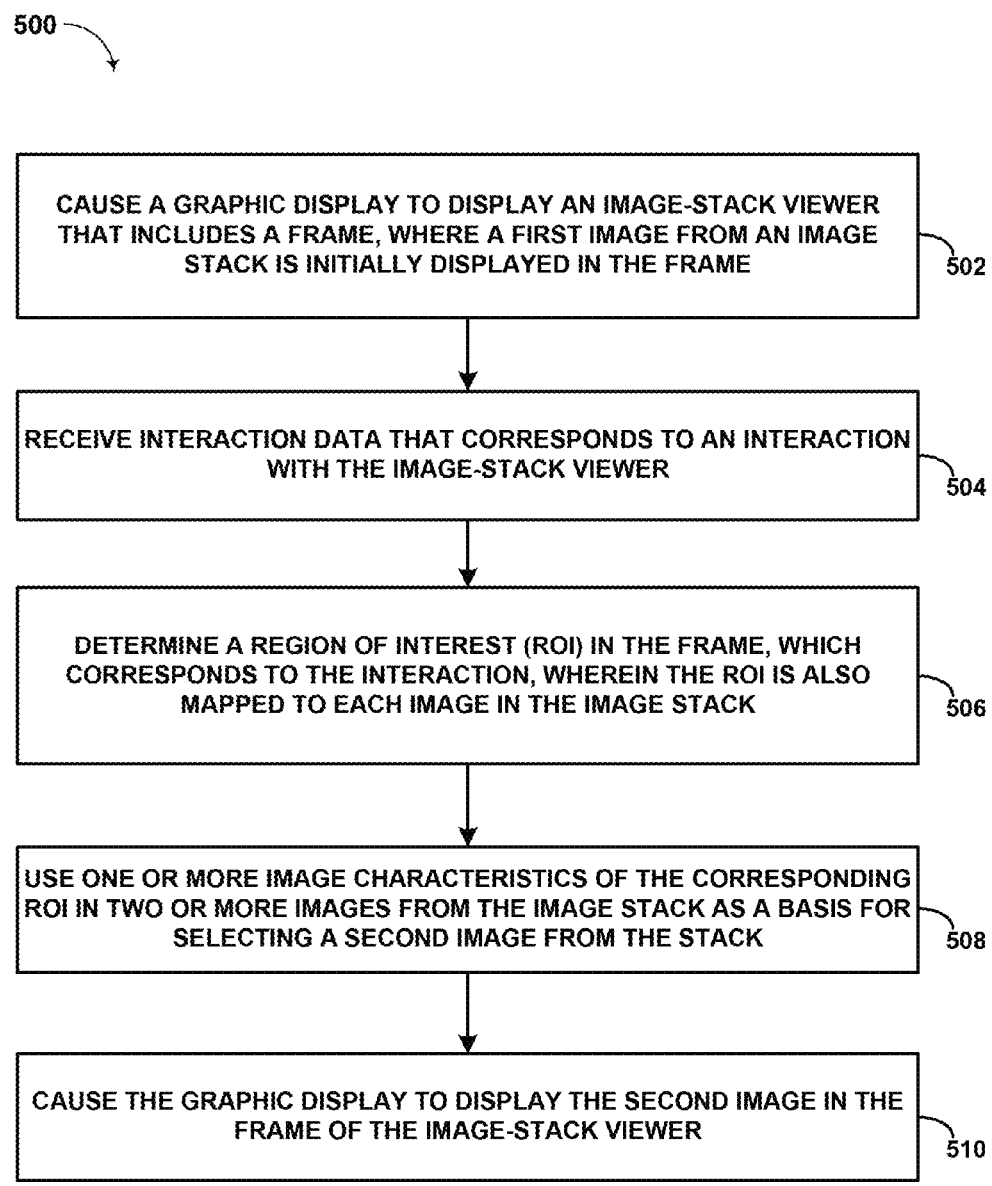
FIG. 5 is a flow chart illustrating a method, in accordance with an example embodiment.

FIG. 5 is a flow chart illustrating a method 500, according to an example embodiment. As shown by block 502, method 500 involves a computing device causing a graphic display to display an image-stack viewer that includes a frame, where a first image from an image stack is initially displayed in the frame. The computing device may then receive interaction data that corresponds to an interaction with the image-stack viewer, as shown by block 504. The computing device may then determine a region of interest (ROI) in the frame, which corresponds to the interaction, as shown by block 506.

In an exemplary embodiment, each image in the stack may be mapped to the frame coordinates of the frame in the image-stack viewer. That is, a mapping may be defined that maps each image coordinate in a given image to an image coordinate in the frame Accordingly, the ROI in the frame can be mapped to a corresponding ROI in each image in the image stack. More specifically, the corresponding ROI in a given image may be defined by the image coordinates in the image are mapped to the coordinates that define the ROI in the frame of the image-stack viewer. Thus, by determining the ROI in the frame, at block 506, the computing device has effectively determined the corresponding ROIs in the images from the image stack.

Further, note that the shape and size of the ROI may vary, depending upon the particular implementation. For example, the ROI could be a rectangular area, a square area, a triangular area, a polygonal area, or an organically shaped area in the frame. Further, the ROI might be sized and/or shaped to fit certain subjects in the scene. For instance, various image processing techniques could be used to detect and identify certain objects (e.g., buildings, roads, trees, products, etc.), certain people, and/or certain landscape features (e.g., a grassy area or the sky) in the image. As such, when the computing device detects an interaction with an area of an image that includes a certain subject, the computing device may fit the ROI around the subject or otherwise define the ROI to include the subject.

Referring again to method 500, block 508 involves the computing device using one or more image characteristics of the corresponding ROIs in two or more images from the image stack as a basis for selecting a second image from the stack. This function may be more simply described as using one or more image characteristics of the ROI to select an image to display. The computing device may then cause the graphic display to display the second image in the frame of the image-stack viewer, as shown by block 510.

A. Image Selection Based on Exposure in the ROI

At block 508, the one or more image characteristics of the ROI may be or may include at least one exposure characteristic. Thus, block 508 may involve a computing device using at least one exposure characteristic of the ROI (e.g., in the ROIs of two or more images in the stack) as a basis for selecting the second image to display.

For example, the computing device may determine the TET in the ROI of the first image and at least a second image from the stack. The TET in the ROI of a given image may be referred to herein as the ROI-TET. In some cases, the computing device may only determine the ROI-TET for two images (e.g., the image that is currently displayed in the image-stack viewer and one other image from the image stack). In other cases, the computing device might determine the ROI-TET for a subset of the images from the image stack. In yet other cases, the computing device might determine the ROI-TET for all of the images from the image stack.

To compute the ROI-TET for a given image, the computing device may use various techniques. For instance, the computing device may use one of the techniques described in section I above, except that the process may be applied only to the ROI, instead of to image as whole.

The computing device may then determine which of the evaluated images has the "best" ROI-TET. The best ROI-TET may be the ROI-TET that best fits certain exposure criteria. For example, FIGS. 6A to 6D illustrate four images 600, 620, 640, and 660 of the same general scene, which are part of an example image stack. In this example, the images 600, 620, 640, and 660 are sequential images of the same scene, with image 600 being the first image that was captured, and image 660 being the last image that was captured.

The scene captured in images 600, 620, 640, and 660 includes seven people 602A-B, 603A-B, and 604A-C, who are located at various places on a hill. The scene further includes a number of clouds 606 in the sky 608, and a tree 610 at the top of the hill. In image 600, two people 602A-B and 602B are located in the foreground of the scene, and two people 603A and 603B are located uphill from the people in the foreground and downhill from three people 604A to 604C that are located at the top of the hill.

In the illustrated example, images 600, 620, 640, and 660 may have been captured during an "exposure sweep," which is a burst or sequence of images in which each image is captured with one or more different exposure settings (e.g., with different TETs). For example, in some instances, a camera may increase or decrease the TET as successive pictures are captured, such that the exposure sweep includes of a scene across a certain range of TETs. In some implementations, the range of exposures that are captured in an exposure sweep may be determined based on an initial metering burst sweep. In other implementations, the range of exposures for an exposure sweep may be determined and/or set in other ways. Further, images in an exposure sweep may be captured with TETs that increase or decrease across a range according to a linear, logarithmic, and/or exponential distribution of TETs, among other possibilities.

In the example illustrated in FIGS. 6A to 6D, the TET increases from the first image 600 to the last image 660 in the exposure sweep. As such, image 600 as a whole may be considered underexposed, image 660 as a whole may be considered overexposed, and image 620 or image 640 may be considered to have the best exposure over the entire image.

Note, however, that there may be certain areas of a scene that, evaluated separately from the rest of the scene, are better exposed in an image that is considered to be overexposed or underexposed as a whole. For example, if the exposure for an image is set based on the scene as a whole, then an area in the scene that is significantly more illuminated than the rest of the scene may be overexposed in the image. Thus, an area in a scene that is significantly more illuminated may be better exposed in an image that is underexposed as a whole. For example, image 600 as a whole may be considered underexposed, while image 620 may be considered to be the best-exposed image in the exposure sweep (e.g., the image taken with the exposure setting determined by an AE process). However, the sky 608 (and the clouds 606 within the sky) may be much brighter than the rest of the scene that is captured during the exposure sweep. As such, the sky 608 and clouds 606 may be better exposed in image 600, than in image 620.

Similarly, if the exposure for an image is set based on the scene as a whole, then an area in the scene that is significantly less illuminated than the rest of the scene may be underexposed in the image. Thus, an area in a scene that is significantly less illuminated may be better exposed in an image that is overexposed as a whole. For example, image 660 as a whole may be considered overexposed, while image 620 may be considered to be the best-exposed image in the exposure sweep (e.g., the image taken with the exposure setting determined by an AE process). However, the group of people 604A to 604C may be under the shade of tree 610, and therefore may be much darker than the rest of the scene that is captured during the exposure sweep. As such, the shaded area that includes people 604A to 604C may be better exposed in image 660 than it is in image 620.

Referring back to FIG. 5, a computing device may implement method 500 to change which image 600, 620, 640, or 660 is displayed in an image-stack viewer, based on user interactions with the displayed image. For instance, consider that an image stack is made up of images 600, 620, 640, and 660. At block 502, an image-stack viewer, such as image-stack viewer 350, may initially display image 620. At block 504, the computing device may receive data that corresponds to an interaction with the area of the sky 608 and clouds 606. For instance, the computing device may detect when the user hovers or clicks a mouse over or near the sky 608. At block 506, the computing device may responsively determine the ROI to be a region that includes some or all of the sky 608 (and possibly some or all of the clouds 606 in the sky 608).

As explained above, the sky 608 may be considered to be somewhat overexposed in image 620. Accordingly, at block 508, the computing device may evaluate the ROI in image 600 (e.g., an area of image 600 that includes substantially the same part of the sky 608 that is within the ROI in image 620), and possibly the ROI in image 640 and/or image 660 as well. At block 508, the computing device may compare the exposure in the ROI of image 600 to the exposure in the ROI of image 620 (and possibly to the exposures of the ROI in images 640 and 660 as well). Since the ROI includes the sky 608, the computing device may determine that the exposure of the ROI is better in image 600, than it is in the other images 620, 640, 660 in the image stack. Accordingly, at block 510, the computing device may select image 600, and cause the image-stack viewer to display image 620 instead of image 600. Note that in an exemplary embodiment, the image-stack viewer may display a graphical transition between image 620 and image 600. Examples of such transitions are described in section VII below.

B. Image Selection Based on Subject Attributes in ROI

At block 508, the one or more image characteristics of the ROI may be or may include at least one subject attribute. Herein, an attribute of the subject may be a physical attribute of a person or object in the scene that is captured in an image. Accordingly, a computing device may implement method 500 to detect when a user interacts with a particular subject in an image that is displayed in an image-stack viewer, set the ROI to include the subject, and display the image from the image stack that is determined to look the best based on the analysis of one or more attributes of the subject. Further, as the user interacts with images that are displayed in the image-stack viewer, the ROI may change according to the interactions. And as the ROI changes, the image-stack viewer may switch between the images in the image stack to display the image in which the current subject of the ROI is determined to look the best, based on one or more subject attributes.

As an example, when an image includes a number of people, a computing device may update the ROI to include whatever person or persons it believes the user to be interested in at the given point in time, based on the user's interactions with the image-stack viewer. For instance, as a user moves a cursor within the frame 352 of an image-stack viewer 350, a computing device may update the ROI to include a person or persons that are located beneath and/or near to the cursor. Further, when the ROI includes a face of person, or faces of multiple people, the computing device may detect and evaluate attributes of the face or faces in two or more images from an image stack. For example, a computing device could evaluate each image in an image stack to determine whether or not each person in the ROI is smiling, to determine whether or not each person in the ROI has "red eye," and/or to determine other facial attributes of each person in the ROI. Based on the evaluation of such attributes, the image-stack viewer may switch between images in the image stack such that at a given point in time, the image-stack viewer is displaying the image that is believed to be the best image of the particular person or persons that a user is interacting with at the given point in time.

As a specific example, a computing device may apply techniques for red-eye detection and/or smile detection to faces located in the ROI of the images 600, 620, 640, 660 shown in FIGS. 6A to 6D. Further, a computing device may evaluate one or more image characteristics of the ROI in each image 600, 620, 640, 660, such as exposure and focus, in addition to performing red-eye detection and/or smile detection. The computing device may then use all such information regarding the ROI in images 600, 620, 640, 660 to determine which image best captures the ROI.

Now consider the red-eye characteristics of each person 602A and 602B in images 600, 620, 640, 660. In image 600, person 602A does not have red eye and is smiling, while person 602B also does not have red eye and is also smiling. In image 620, person 602A has red eye but is smiling, while person 602B does not have red eye, and is smiling. In image 640, person 602A does not have red eye, but is not smiling, while person 602B also does not have red eye, and is smiling. In image 660, person 602A does not have red eye, but is not smiling, while person 602B has red eye, but is smiling If a computing device receives interaction data corresponding to a user hovering a cursor over person 602A in the frame 352 of an image-stack viewer 350, the computing device may responsively determine that the ROI is the face of person 602A. Accordingly, the computing device may evaluate various characteristics of the ROI in each image 600, 620, 640, 660, and select an image that best captures the face of person 602A for display in the frame of the image-stack viewer.

In some implementations, the computing device might evaluate a single aspect of the ROI to determine which image best captures the ROI, such as by performing either red-eye detection or smile-detection, or by evaluating a single image characteristic, such as exposure. In other implementations, a computing device may attempt to improve the image selection process by evaluating multiple aspects of the ROI.

For example, the computing device apply only red-eye detection to person 602A in each image 600, 620, 640, 660, and select an image to display based on this analysis. More specifically, since person 602A does not have red eye in image 600, 640, or 660, the computing device might display any one of these three images. As another example, the computing device could perform smile detection on person 602A in each image 600, 620, 640, 660. Since person 602A is smiling in images 600 and 620, the computing device might display either of these two images.

Note that in the two examples above, there was not a single image that was determined to be the "best." It is possible, in other examples, for the evaluation of a single aspect to identify one image that best captures an ROI. As noted the computing device could also evaluate other aspects of the ROI, in conjunction with evaluating the person's face for red eye or a smile, in an effort to improve the selection process.

For example, when the ROI is defined as the face of person 602A, the computing device may perform smile detection to determine that person 602A is smiling in both images 600 and 620, and determine that the exposure of the face of person 602A is better in image 620 than in image 600. Thus, the computing device may select image 620 based on combinations of smile detection and exposure analysis in the ROI.

As another example, when the ROI is defined as the face of person 602A, the computing device could apply both red-eye detection and smile detection to the ROI in each image 600, 620, 640, 660. In this case, the computing device may select image 600, as this may be the only image where person 602A does not have red eye and is also determined to be smiling.

As yet another example, when the ROI is defined as the face of person 602A, the computing device could apply both red-eye detection and smile detection to the ROI in each image 600, 620, 640, 660, and could also evaluate the exposure of the face in each image 600, 620, 640, 660. As noted above, image 600 may be the only image where person 602A does not have red eye and is also determined to be smiling. However, the computing device may determine that in image 640, where person 602A does not have red eye but is not smiling, the face of person 602A is better exposed than in image 600. Further, the computing device may determine that in image 620, where person 602A is smiling but has red eye, the face of person 602A is better exposed than in images 640 and 600.

Since the only picture where person 602A is smiling and does not have red eye is not the best exposed, the computing device may weigh the results of the red-eye detection, smile detection, and exposure analysis (and possibly other factors) to determine which image to select. Depending on the weight given to each factor and how the weighting is applied in a given implementation, a different one of images 600, 620, 640 may be selected. For example, image 620 may be selected if the better exposure in image 620, as compared to images 600 and 620, outweighs the fact that person 602A has red eye in image 620. As another example, image 640 may be selected if (a) the better exposure in image 640, as compared to image 600, outweighs the fact that person 602A is smiling in image 600 and (b) the lack of red eye in image 640 outweighs the better exposure in image 620 and the fact the person is smiling in image 620. Other examples are also possible.

Note that the ROI may be defined in different ways depending upon the particular implementation. For instance, as explained above, a computing device could set the ROI to be the face of person 602A in response to detecting a cursor hovering over person 602A in the frame 352 of an image-stack viewer 350. However, in another implementation, the computing device might respond to the same interaction by setting the ROI to include the faces of both persons 602A and 602B. (Note that the computing device may also set the ROI to be the faces of persons 602A and 602B in response to the cursor hovering over person 602B, or in response to the cursor hovering near to person 602A and/or person 602B.) For example, referring back to method 500 of FIG. 5, applying block 506, the computing device may analyze the scene captured in images 600, 620, 620, 660 and determine that the image stack is likely intended to capture persons 602A and 602B together (e.g., due to their location and size in the image frame, their positioning next to each other, etc.). Based on this analysis, the computing device may define the ROI as including both faces, whenever a cursor remains in an area over or near the faces for a predetermined period of time.

Note that changing the way the ROI is defined may also change which image is selected for display. For instance, when the ROI includes the faces of both persons 602A and 602B instead of just person 602A, red-eye detection and/or smile detection might be performed on both persons 602A and 602B, instead of just being performed on person 602A. In this case, when red-eye detection and smile detection are performed on faces in the ROI, the computing device may select image 600 since this is the only image in which person 602A and person 602B are both smiling and both do not have red eye.

In yet another example, the ROI may follow the motion of a subject of interest. In particular, a user may use a continuous gesture to identify an ROI and indicate a movement of the ROI that follows the movement of a subject in the image stack. For example, consider an image stack in which a car passes by in the foreground, and thus moves between images in the image stack. A computing device may be configured to cause the ROI to follow the car, in response to a user selecting the car and performing a dragging gesture along the path of the car's movement.

For example, the user could scrub backwards and forwards in time within the image stack according to the motion of the car, with the ROI following the car, by tapping a touchscreen on the car and dragging their finger forward or backward along the car's path, or by clicking on the car with a mouse cursor, and then holding the mouse button down while dragging the mouse cursor forward or backward along the car's path. Yet further, when an image-stack viewer is capable of following the motion path of the subject with the ROI, the image-stack viewer could display graphics to represent the motion path. Since the user only sees a single still image from the image stack at any given point in time, overlaying the motion path on the displayed image may cue the user as to what direction they can enter gestures to cause the ROI to follow the motion path.

VI. Image-Stack Viewer as Part of a Social Network

In some of the above-described examples, method 500 was applied to switch to between images that included multiple people, so that an image-stack viewer displays the best image of the particular person or persons that are being interacted in the viewer at a given point in time. This type of implementation, in which an image-stack viewer switches between images based on attributes of people in the current ROI, may be useful in a number of contexts, and may be particularly useful in the context of social networks, where users often post and share photos of people. For example, an image-stack viewer could be implemented as part of a social-network website or application.

In the context of a social network, the ROI may additionally or alternatively be evaluated based on social-network data. Thus, when method 500 is implemented in the context of a social network, the one or more image characteristics of the ROI, which are used at block 508, may be or may include social-network data associated with the ROI. Such social-network data may include user-provide data, such as data from a user account or from multiple user accounts. Social network data could also include data that is gathered by the social network provider itself, such as data based on users' activity on the social network. Other types of social-network data may also be utilized to evaluate the ROI.

In an example embodiment, a social network website or application may include an interface that allows a user to upload an image stack. In particular, the interface may allow a user to add a number of image files that make up an image stack. The image files may then be associated with one another as being part of an image stack. For example, metadata may be added to the image files to indicate to an image-stack viewer that the image files are part of the same image stack. Further, once the user has uploaded the image files, the image stack may be associated with the user's account on the social network.

Once a user has uploaded an image to a social network, the user and/or other users may "tag" a location in an image to indicate the name of a person who is located at the particular location in the image. In some cases, the name of the person may also be associated with another user's account on the social network. In such case, social-network data from user accounts on the social network may indicate whether or not a person that is tagged in an image is a "friend" of another user.

When a person is tagged in an image that is part of an image stack, the tag may be propagated through to some or all of the images in the image stack. More specifically, a computing device may attempt to locate the same person in other images from the stack and, if the person is located, tag the other images in the same manner. Accordingly, an implementation in a social network may use tags in an image stack to help determine which image from an image stack should be displayed at a given point in time.

In an example embodiment, when a computing device provides an image-stack viewer as part of a social network, the computing device may determine an ROI based on a user's interactions with the viewer. The computing device may then evaluate social-network data to determine whether there is a tag or tags in the ROI, and/or to determine whether each person identified by a tag is a friend of the user who is interacting with the image-stack viewer (e.g., by determining whether friend data from the user account of the interacting user includes the user account of the tagged person).

The computing device may then base the selection of an image from the image stack on tags that are located in the ROI. For instance, if the ROI in an image includes three people, but only two of them are tagged, then the computing device may attempt to select the image in which the tagged individuals look the best (e.g., by evaluating various facial attributes of the two people that are tagged), without consideration as to the appearance of the third person who is not tagged.

Further, a computing data might attempt to improve the image-selection process by using data indicating whether or not a tagged person is a friend of the user who is viewing the image stack. For example, if the ROI includes two people that are tagged, a computing device may determine whether or not each tag is associated with a user account that is associated as a friend with the user account of the user who is interacting with the image-stack viewer. The computing device may then focus on tagged friends when determining which image to display in the image-stack viewer. For example, consider an image where a first and a second person are both tagged in the ROI, and the first person is a friend while the second person is not. Since the first person is a friend, the computing device may attempt to select the image in which the first person look the bests, without consideration as to the appearance of the second person who is tagged but is not a friend.

In a further aspect of a social-network implementation, social network data may be utilized to help define where the ROI is located within a frame 352 of an image-stack viewer 350. In particular, data provided by tags in an image stack may be used to help interpret what area of an image interaction data corresponds to. For example, referring to image 600 of FIG. 6A, consider a first scenario where a cursor is detected as hovering over image 600 at a location that is between persons 603A-B and persons 602A-B. Without further information, this interaction data might be ambiguous as to whether the ROI should include persons 603A-B or persons 602A-B. However, in this scenario, both person 602A and person 602B may be tagged, while persons 603A-B are not tagged. Based on these tags in the image, the ROI may be set to include persons 602A-B, but not persons 603A-B.

Figure 6A:
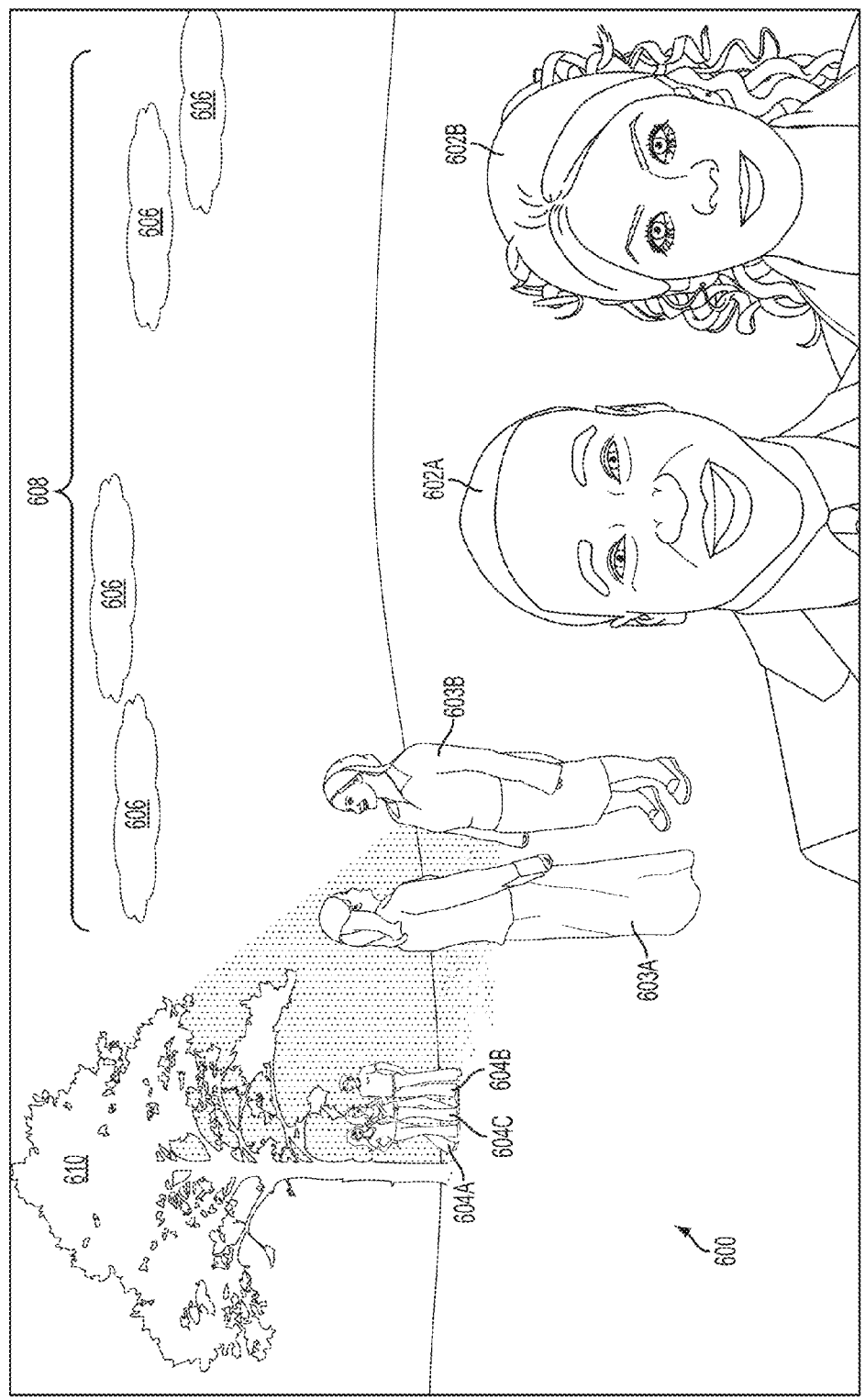
FIGS. 6A to 6D illustrate four images of the same general scene, which are part of an image stack, in accordance with an example embodiment.
Figure 6B:
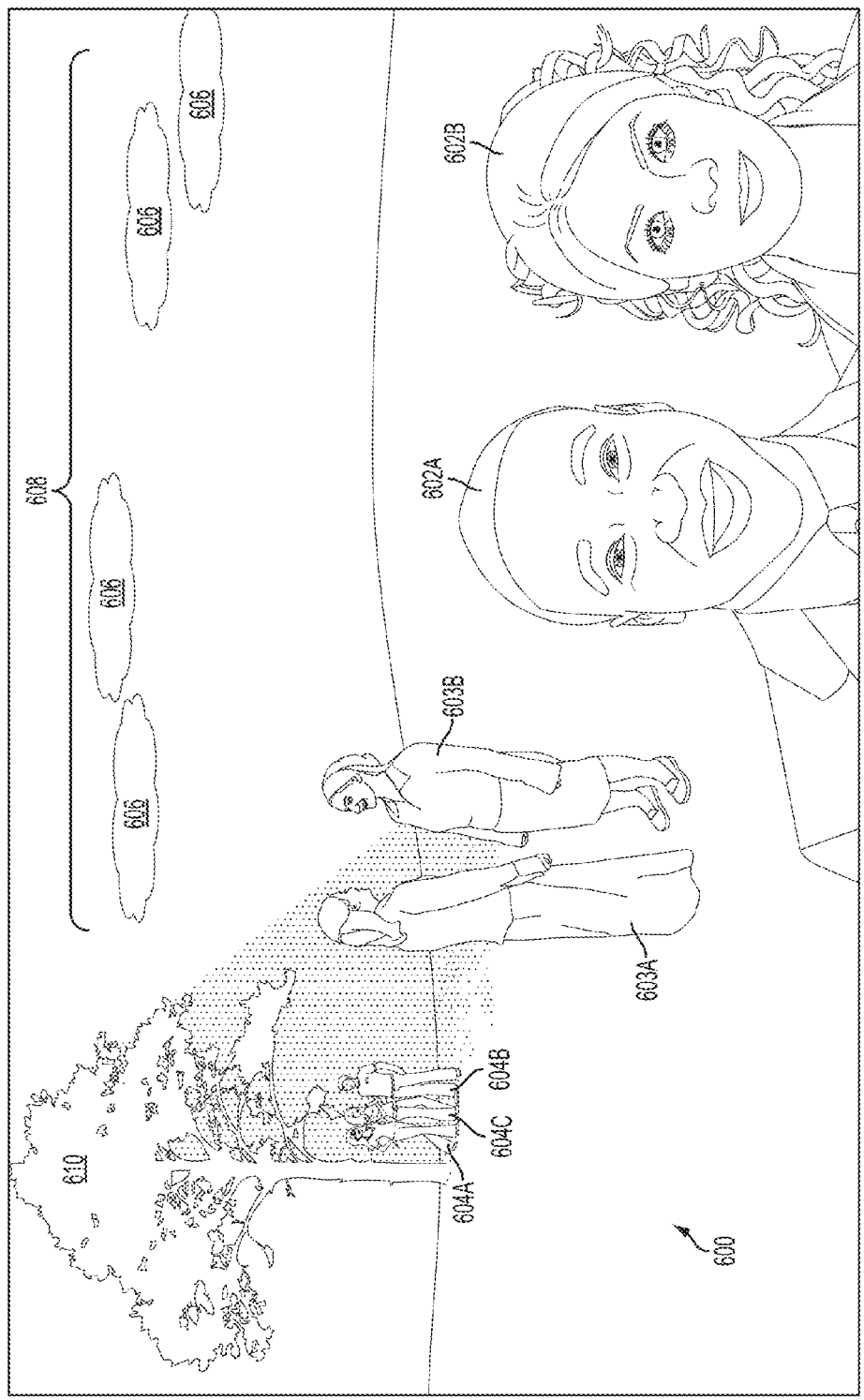
Figure 6C:
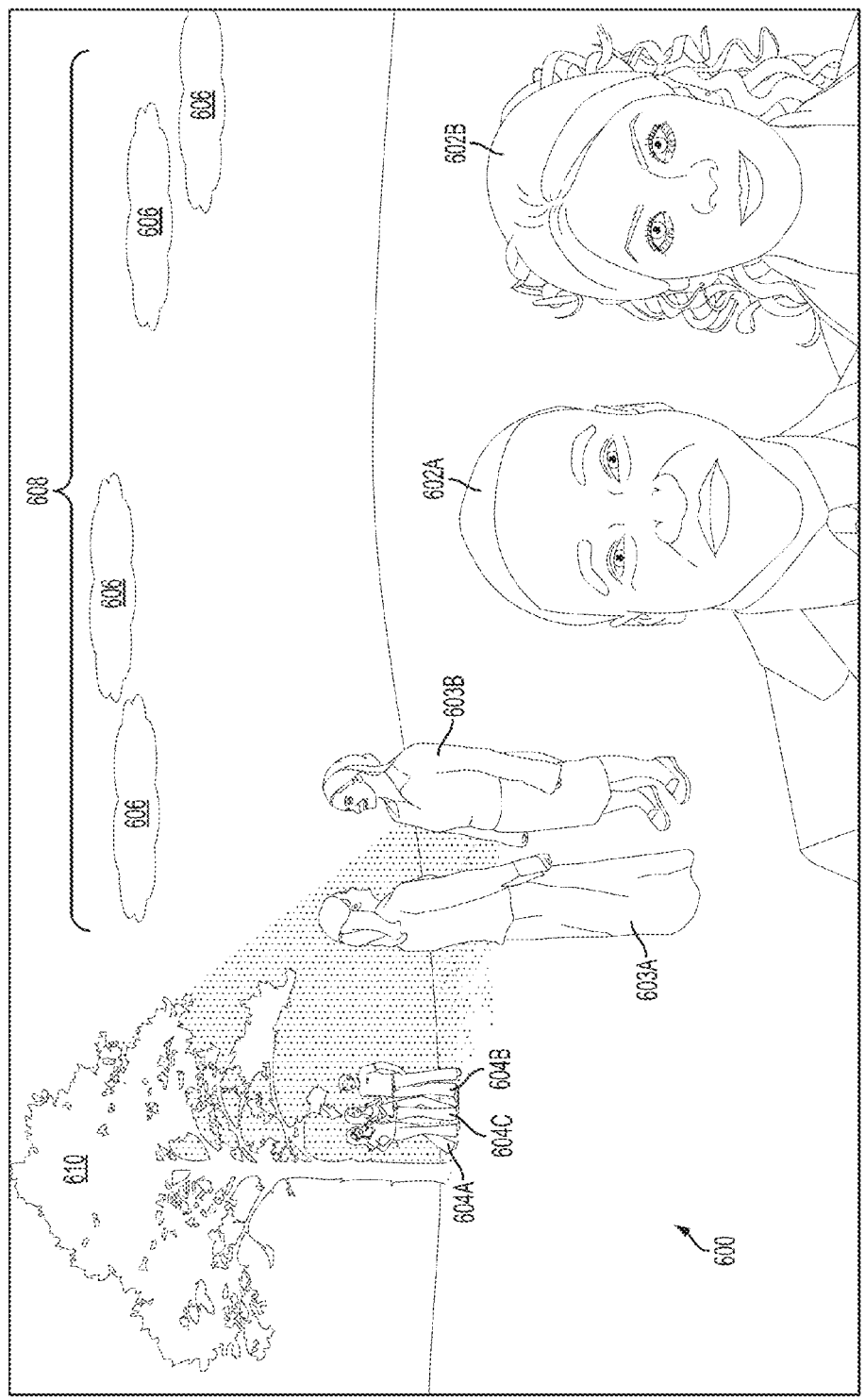
Figure 6D:
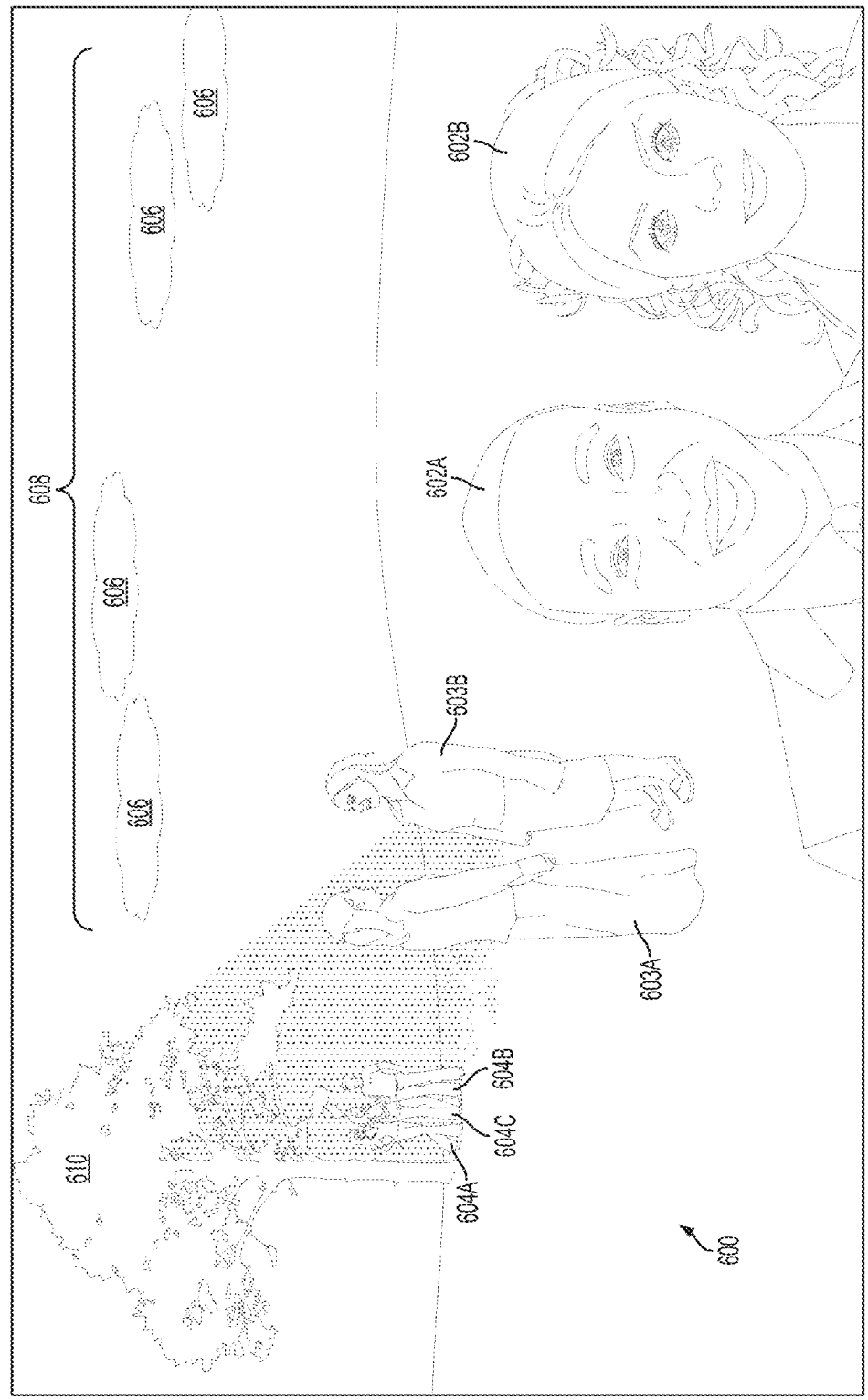

As another example, referring again to image 600 of FIG. 6A, consider a second scenario where a cursor is again detected as hovering over image 600 at a location that is between persons 603A-B and persons 602A-B. However, in the second scenario, all of persons 602A, 602B, 603A, and 603B may be tagged. Further, in this scenario, persons 603A and 603B are both friends of the user who is interacting with the image, while persons 602A and 602B are not friends of the user. Based on the fact that persons 603A and 603B are both friends, the ROI may be set to include persons 603A-B, instead of persons 602A-B.

VII. Transitions Between Images in an Image-Stack Viewer

As noted above, when an image-stack viewer switches from a first image to a second image in an image stack, the viewer may display a graphical transition between the two images. Various types of transitions are possible.

In some cases, transitions may involve a simple cut between a first and a second image. In other cases, graphics such as a cross-fade or other animations may be used to transition between two images. In some cases, transitional graphics, such as a cross-fade or another animation, may be generated from the first image and/or the second image.

Additionally or alternatively, the transition may include or be based at least in part on intervening images from the image stack, which were captured in between the first and the second image. For example, referring to FIG. 3A, if an image-viewer is switching from image 302A to image 302E in image stack 300, the transition may involve sequentially displaying intervening images 302B to 302D, in order to show the runner 306 progressing down the track from the runner's location on the track in image 302A to the runner's location on the track in image 302E.

Further, in some implementations, a computing device might use processing techniques to interpolate the runner's position between each pair of consecutive images in image stack 300. The interpolated positioning of runner 306 may be used to generate additional frames to display in between each pair of consecutive images in image stack 300. Accordingly, the transition from image 302A to 302E might involve displaying one or more generated images that interpolate the location, size, and/or posture of runner 306 between image 302A and 302B, then displaying image 302B, then displaying one or more generated images that interpolate the location, size, and/or posture of runner 306 between image 302B and 302C, then displaying image 302C, and so on.

In some embodiments, a computing device may dynamically generate transitional graphics based on image characteristics of the image stack, subject attributes of the scene captured, and/or an analysis of motion captured in the image stack.

For instance, a computing device may perform motion analysis between a first image and a second image in an image stack. The computing device may then determine or adjust a transition from the first image to the second image, based on the motion analysis. For example, when transitioning between two images, a computing device may adjust the rate at which intervening images are displayed based on the amount of motion in the scene between the two images. For example, referring to the image stack 300 shown in FIG. 3A, there is significant motion between image 302A, where runner 306 is located at the far end of the track, and image 302E, where runner 306 is located at the end of the track. Since there is significant motion, a computing device may increase the rate at which intervening images 302B to 302D are displayed during a transition from image 302A to image 302E. By displaying the intervening images more rapidly, the "jump" in position of the runner 306 in each successive image may be less noticeable to the eye. Additionally or alternatively, because significant motion is detected, the computing device may generate additional images that interpolate the location, size, and/or posture of runner 306 between images of image stack 300. By generating and displaying such additional images as part of a transition from image 302A to image 302E, the transition may appear smoother and/or more fluid to the eye.

As another example, referring to the image stack 400 shown in FIG. 4A, there is little motion, if any, between images 402A, 402B, and 402C. Accordingly, a computing device may decrease the rate at which it shows, image 402A, intervening image 402B, and 402C during a transition from image 302A to image 302E. Further, the computing device might refrain from generating additional images or, if additional images are generated, may decrease the rate at which such additional images and intervening image 402B are displayed in a transition where these images are sequentially displayed.

VIII. Conclusion

The above detailed description describes various features and functions of the disclosed systems, devices, and methods with reference to the accompanying figures. In the figures, similar symbols typically identify similar components, unless context indicates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computer-implemented method comprising:
    receiving an instruction to display, within a social-network interface, an image-stack viewer that comprises a frame, wherein the social-media interface is associated with a first account on a social network;
    determining respective locations of one or more tags in one or more images from an image stack, wherein the image stack comprises a plurality of images of a scene:
    using one or more image characteristics at the respective locations of the one or more tags in the one or more images in two or more images from the stack as a basis for selecting a first image from the image stack, wherein at least one tag is associated with a second account on the social network;
    displaying the first image in the frame;
    receiving interaction data that corresponds to an interaction with the image-stack viewer;
    determining a region of interest (ROI) in the frame, wherein the ROI corresponds to the interaction, and wherein the ROI in the frame maps to a corresponding ROI in each image from the stack;
    using one or more image characteristics of the ROI in two or more images from the stack as a basis for selecting a second image from the stack, wherein the one or more image characteristics comprise at least one exposure characteristic; and
    causing the graphic display to display the second image in the frame of the image-stack viewer.

2. The method of claim 1, wherein the image stack comprises a plurality of temporally related images of a scene.

3. The method of claim 1, wherein the image stack comprises one of: (a) a plurality of frames from a video, (b) a plurality of images from a time-lapse sequence, and (c) a plurality of images of captured in response to a single image-capture instruction.

4. The method of claim 1, wherein two or more images from the image stack were captured with different image-capture settings, wherein the different image-capture settings comprise one or more of: (a) different exposure settings, (b) different aperture settings, (c) different ISO settings, (d) different white-balance settings, and (e) different tone-mapping settings.

5. The method of claim 1, wherein two or more images from the image stack have different image-capture settings, wherein the different image-capture settings comprise two or more of: (a) different exposure settings, (b) different aperture settings, (c) different ISO settings, (d) different white-balance settings, and (e) different tone-mapping settings.

6. The method of claim 1, wherein the plurality of images from the image stack comprises a plurality of different versions of a base image, wherein the different versions are generated by either (a) varying one or more parameters of an image-processing technique that is applied to the base image or (b) applying multiple image-processing techniques to the base image.

7. The method of claim 1, wherein the plurality of images from the image stack comprises a plurality merged images, wherein each merged image is generated by applying a merging process to an image burst comprising a plurality of images, wherein one or more parameters of the merging process are varied when each merged image is generated.

8. The method of claim 1, wherein the interaction comprises one or more of: (a) a mouse hover, (b) a mouse click, (c) an eye gesture, (d) a hand gesture, (e) a touch gesture, and (f) a social-network interaction.

9. The method of claim 1, wherein the one or more image characteristics of the ROI comprise two or more of: (a) focus, (b) exposure, (c) contrast, (d) white balance, and (e) one or more image-subject characteristics.

10. The method of claim 1, wherein the one or more image characteristics of the ROI further comprise one or more subject attributes of at least one subject in the ROI.

11. The method of claim 10, wherein the one or more subject attributes of the at least one subject in the ROI comprise one or more facial attributes of a face that is captured in the ROI.

12. The method of claim 1, wherein causing the graphic display to display the second image in the frame of the image-stack viewer comprises causing the graphic display to display a transition from the first image to the second image.

13. The method of claim 12, wherein the transition comprises a transition animation or effect.

14. The method of claim 13, wherein the transition is based on one or more intervening images from the image stack, wherein the one or more intervening images temporally between the first image and the second image.

15. The method of claim 13, further comprising determining one or more motion parameters that are indicative of motion in the scene between the first image and the second image, wherein the transition is based on the one or more motion parameters.

16. The method of claim 1 wherein the first account and the second account are the same account.

17. The method of claim 1 wherein the second account has a friend relationship with the first account.

18. The method of claim 17, wherein the interaction corresponds to a location, in the frame, of the tag associated with the second account, wherein the determined ROI corresponds the location of the tag associated with the second account.

19. The method of claim 17, wherein the selecting of the second image from the stack is further based on the friend relationship between the first account and the second account.

20. A computing device comprising:
a non-transitory computer readable medium;
program instructions stored on the non-transitory computer readable medium and executable by at least one processor to:
cause a graphic display to display, within a social-network interface, an image-stack viewer that comprises a frame, wherein the social-media interface is associated with a first account on a social network;
determine respective locations of one or more tags in two or more images from an image stack, wherein the image stack comprises a plurality of images of a scene;
use one or more image characteristics at the respective locations of the one or more tags in the two or more images from the stack as a basis to select a first image from the image stack, wherein at least one tag is associated with a second account on the social network;
display the first image in the frame;
receive interaction data that corresponds to an interaction with the image-stack viewer;
determine a region of interest (ROI) in the frame, wherein the ROI corresponds to the interaction, and wherein the ROI in the frame maps to a corresponding ROI in each image from the stack;
based on one or more image characteristics of the ROI in two or more images from the stack, selecting a second image from the stack, wherein the one or more image characteristics comprise at least one exposure characteristic; and
cause a graphic display to display the second image in the frame of the image-stack viewer.

21. The computing device of claim 20, wherein the image stack comprises a plurality of temporally related images of a scene.

22. A computer-implemented method comprising:
receiving an instruction to display, within a social-network interface, an image-stack viewer that comprises a frame, wherein the social-media interface is associated with a first account on a social network;
determining respective locations of one or more tags in one or more images from an image stack, wherein the image stack comprises a plurality of images of a scene;
using one or more image characteristics at the respective locations of the one or more tags in the one or more images in two or more images from the stack as a basis for selecting a first image from the image stack, wherein each tag is associated with a corresponding account on the social network;
displaying the first image in the frame;
receiving interaction data that corresponds to an interaction with the image-stack viewer;
determining a region of interest (ROI) at a location in the frame corresponding to at least one of the tags, wherein the ROI corresponds to the interaction;
using one or more image characteristics of the ROI in two or more images from the stack as a basis for selecting a second image from the stack, wherein the one or more image characteristics of the ROI comprise at least one subject attribute of at least one subject that is identified by the at least one tag corresponding to the ROI; and
causing the graphic display to display the second image in the frame of the image-stack viewer.

23. The method of claim 22, wherein at least one subject attribute of the at least one subject in the ROI comprises at least one facial attribute of at least one face that is located in the ROI.

24. The method of claim 23, further comprising evaluating the at least one subject attribute of the at least one face in the ROI of the first image and one or more others images from the image stack.

25. The method of claim 24, wherein evaluating the at least one subject attribute of the at least one face comprises performing at least one of: (a) a smile-detection process and (b) a red-eye detection process.

26. A computing device comprising:
a non-transitory computer readable medium;
program instructions stored on the non-transitory computer readable medium and executable by at least one processor to:
cause a graphic display to display, within a social-network interface, an image-stack viewer that comprises a frame, wherein the social-media interface is associated with a first account on a social network;
select a first image from an image stack that comprises a plurality of images of a scene, wherein selection of the first image is based on one or more tags corresponding to one or more of the images in the image stack, wherein each tag is associated with a corresponding account on the social network;
display the first image in the frame;
receive interaction data that corresponds to an interaction with the image-stack viewer;
determine a region of interest (ROI) at a location in the frame corresponding to at least one of the tags, wherein the ROI corresponds to the interaction;
use one or more image characteristics of the ROI in two or more images from the image stack as a basis to select a second image from the image stack, wherein the one or more image characteristics of the ROI comprise at least one subject attribute of at least one subject that is identified by the at least one tag corresponding to the ROI;
cause the graphic display to display the second image in the frame of the image-stack viewer; and
determine that a particular user account is associated with a tag in the first image and responsively: (a) analyze each of one or more other images from the image stack to determine whether the image includes image data corresponding to the particular user account, and (b) associate a new tag corresponding to the particular user account with each of the one or more other images that is determined to include image data corresponding to the particular user account.

27. The computing device of claim 26, wherein at least one subject attribute of the at least one subject in the ROI comprises at least one facial attribute of at least one face that is located in the ROI.

28. The computing device of claim 27, wherein the at least one facial attribute comprises at least one of (a) whether or not a smile is detected and (b) whether or not red eye is detected.

* * * * *